(12) United States Patent
Arutyunov

(10) Patent No.: US 6,611,868 B1
(45) Date of Patent: Aug. 26, 2003

(54) METHOD AND SYSTEM FOR AUTOMATIC LINK HANG UP

(75) Inventor: Yuri Arutyunov, Schaumburg, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/316,420

(22) Filed: May 21, 1999

(51) Int. Cl.[7] .............................................. G06F 13/00
(52) U.S. Cl. ..................................................... 709/227
(58) Field of Search ................................ 709/200, 201, 709/223, 224, 225, 227, 238; 725/111, 110, 9

(56) References Cited

U.S. PATENT DOCUMENTS

| | | |
|---|---|---|
| 5,014,234 A | 5/1991 | Edwards, Jr. ............... 364/900 |
| 5,138,712 A | 8/1992 | Corbin ....................... 395/700 |
| 5,241,587 A | 8/1993 | Horton et al. |
| 5,301,274 A | 4/1994 | Li |
| 5,347,304 A | 9/1994 | Moura et al. |
| 5,442,749 A | 8/1995 | Northcutt et al. ...... 395/200.09 |
| 5,488,412 A | 1/1996 | Majeti et al. |
| 5,489,897 A | 2/1996 | Inoue ..................... 340/870.39 |
| 5,528,595 A | 6/1996 | Walsh et al. ............. 370/85.13 |
| 5,583,931 A | 12/1996 | Schneider et al. |
| 5,586,121 A | 12/1996 | Moura et al. |
| 5,600,717 A | 2/1997 | Schneider et al. |
| 5,606,606 A | 2/1997 | Schneider et al. |
| 5,608,446 A | 3/1997 | Carr et al. |
| 5,623,542 A | 4/1997 | Schneider et al. |
| 5,623,601 A | 4/1997 | Vu ......................... 395/187.01 |
| 5,636,211 A | 6/1997 | Newlin et al. |
| 5,675,732 A | 10/1997 | Majeti et al. |
| 5,710,885 A | 1/1998 | Bondi .................... 395/200.54 |
| 5,725,383 A | 3/1998 | Funahashi et al. |
| 5,761,602 A | 6/1998 | Wagner et al. ............... 455/3.1 |
| 5,778,181 A | 7/1998 | Hidary et al. .......... 395/200.48 |
| 5,784,597 A | 7/1998 | Chiu et al. .................. 395/552 |
| 5,790,198 A | 8/1998 | Roop et al. ................. 348/460 |

(List continued on next page.)

FOREIGN PATENT DOCUMENTS

WO    WO 00/67385    11/2000

OTHER PUBLICATIONS

"Cable Modem to Customer Premise Equipment Interface Specification (Interim) SP–CMCI–I02–980317", Multimedia Cable Network Systems (MCNS) Holdings, L.P., 1998, pp. ii to 40.

"Operations Support System Interface Specification Baseline Privacy Interface MIB (Interim) SP–OSSI–B–PI–I01–980331", MCNS Holdings, L.P., 1998, pp. ii to 33.

"Cable Modem Termination System–Network Side Interface Specification (Interim Specification) SP–CMTS–N-SII01–960702", MCNS Holdings, L.P., 1996, pp. ii to 13.

(List continued on next page.)

*Primary Examiner*—Robert B. Harrell
(74) *Attorney, Agent, or Firm*—McDonnell Boehnen Hulbert & Berghoff

(57) ABSTRACT

Methods and systems pertaining to automatically and locally terminating a telephone dial-up connection to a data network are presented as an alternative to an inactivity timeout set by the cable television network headend. A cable modem in a data-over-cable system with telephony return is connected on an upstream telephone dial-up connection to a data network such as the Internet. The cable modem monitors a network interface for incoming data transmission activity from consumer premise equipment, including a personal computer system, connected to the cable modem. If the cable modem determines no incoming data transmission activity, the cable modem begins to query the status of the consumer premise equipment. If the consumer premise equipment does not respond to repeated queries within a specified time, the cable modem terminates the telephone dial-up connection.

52 Claims, 19 Drawing Sheets

U.S. PATENT DOCUMENTS

| | | |
|---|---|---|
| 5,790,548 A | 8/1998 | Sistanizadeh et al. ........ 370/401 |
| 5,790,677 A | 8/1998 | Fox et al. ..................... 380/24 |
| 5,799,086 A | 8/1998 | Sudia .......................... 380/23 |
| 5,805,804 A | 9/1998 | Laursen et al. ........ 395/200.02 |
| 5,812,819 A | 9/1998 | Rodwin et al. ............. 395/500 |
| 5,815,664 A | 9/1998 | Asano ................... 395/200.57 |
| 5,818,845 A | 10/1998 | Moura et al. ............... 370/449 |
| 5,819,042 A | 10/1998 | Hansen .................. 395/200.52 |
| 5,828,655 A | 10/1998 | Moura et al. ............... 370/236 |
| 5,835,727 A | 11/1998 | Wong et al. ........... 395/200.68 |
| 5,854,901 A | 12/1998 | Cole et al. .................. 709/245 |
| 5,859,852 A | 1/1999 | Moura et al. ............... 370/449 |
| 5,862,338 A | 1/1999 | Walker et al. |
| 5,864,679 A | 1/1999 | Kanai et al. ................. 709/238 |
| 5,870,134 A | 2/1999 | Laubach et al. ............. 348/12 |
| 5,872,523 A | 2/1999 | Dellaverson et al. .. 340/825.52 |
| 5,884,024 A | 3/1999 | Lim et al. .............. 395/187.01 |
| 5,922,049 A | 7/1999 | Radia et al. ................. 709/220 |
| 5,923,659 A | 7/1999 | Curry et al. ................ 370/401 |
| 5,926,458 A | 7/1999 | Yin ............................ 370/230 |
| 5,929,850 A | 7/1999 | Broadwin et al. ........... 345/327 |
| 5,941,988 A | 8/1999 | Bhagwat et al. ............ 713/201 |
| 5,958,007 A | 9/1999 | Lee et al. .................... 709/219 |
| 5,960,177 A | 9/1999 | Tanno ................... 395/200.59 |
| 5,974,453 A | 10/1999 | Anderson et al. ........... 709/220 |
| 5,996,076 A | 11/1999 | Rowney et al. ............. 713/201 |
| 6,009,103 A | 12/1999 | Woundy ..................... 370/401 |
| 6,012,088 A | 1/2000 | Li et al. ...................... 709/219 |
| 6,013,107 A | 1/2000 | Blackshear et al. ......... 703/229 |
| 6,018,767 A | 1/2000 | Fijolek et al. ............... 709/218 |
| 6,032,019 A | 2/2000 | Chen et al. .................. 455/5.1 |
| 6,046,979 A | 4/2000 | Bauman ..................... 370/229 |
| 6,049,826 A | 4/2000 | Beser ......................... 709/222 |
| 6,058,421 A | 5/2000 | Fijolek et al. ............... 709/225 |
| 6,064,372 A | 5/2000 | Kahkoska .................. 345/173 |
| 6,070,246 A | 5/2000 | Beser ......................... 713/201 |
| 6,243,369 B1 | 6/2001 | Grimwood et al. ......... 370/335 |
| 6,289,377 B1 | 9/2001 | Lalwaney et al. .......... 709/222 |
| 6,301,223 B1 | 10/2001 | Hrastar et al. .............. 370/227 |
| 6,301,618 B1 | 10/2001 | Sitaraman et al. .......... 709/227 |
| 6,308,328 B1 * | 10/2001 | Bowcutt et al. ............. 725/111 |
| 6,331,987 B1 | 12/2001 | Beser ......................... 370/486 |
| 6,332,163 B1 | 12/2001 | Bowman-Amuah ......... 709/231 |
| 6,337,858 B1 | 1/2002 | Petty et al. .................. 370/356 |
| 6,351,773 B1 | 2/2002 | Fijolek et al. ............... 709/228 |
| 6,370,147 B1 | 4/2002 | Beser ......................... 370/401 |
| 6,393,478 B1 | 5/2002 | Bahlmann ................... 709/224 |
| 6,442,158 B1 | 8/2002 | Beser ......................... 370/352 |
| 6,449,291 B1 | 9/2002 | Burns et al. ................. 370/516 |
| 6,453,472 B1 | 9/2002 | Leano et al. ................ 725/111 |
| 6,490,727 B1 | 12/2002 | Nazarathy et al. .......... 725/129 |
| 6,510,162 B1 | 1/2003 | Fijolek et al. ............... 370/432 |
| 2002/0122050 A1 | 9/2002 | Sandberg .................... 345/705 |
| 2002/0136165 A1 | 9/2002 | Ady et al. ................... 370/241 |
| 2003/0028891 A1 | 2/2003 | Hardt et al. ................. 725/107 |

OTHER PUBLICATIONS

"Removable Security Module Interface Specification (Interim Specification) SP–RSMI–I01–980204", MCNS Holdings, L.P., 1997, pp. ii to 48.

"Baseline Privacy Interface Specification (Interim) SP–BPI0I01–970922", MCNS Holdings, L.P., 1997, pp. ii to 66.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., 1997, pp. ii to 74.

"Security System Specification (Interim Specification) SP–SSI–I01–970506", MCNS Holdings, L.P., 1997, pp. ii to 103.

"Internet Engineering Task Force, Request for Comments 2131, Dynamic Host Configuration Protocol (DHCP)", Mar. 1997, pp. 1 to 42.

S. Adiraju, J. Fijolek, IPCDN Telephony Return MIB, Internet Engineering Task Force, Internet Draft, "<draft–ietf–ipcdn–tri–mib–00.1.txt>," Mar. 23, 1998, pp. 1 to 26.

"Radio Frequency Interface Specification (Interim Specification) SP–RFI–I05–991105", MCNS Holdings, L.P., 1999, pp. ii to 202.

"Radio Frequency Interface Specification (Interim Specification) SP–RFIv.1.1–I06–001215", MCNS Holdings, L.P., 2000, pp. ii to 432.

Droms, R., *Dynamic Host Configuration Protocol,* Request for Comments 1541, Oct. 1993, pp. 1 to 31.

RFC 791, *Internet Protocol, DARPA Internet Program Protocol Specification,* Sep. 1981, pp. 1–37.

Postel, J., *Internet Protocol, DARPA Internet Program Protocol Specification,* RFC 792, Sep. 1981, pp. 1–14.

Postel, J., *User Datagram Protocol,* RFC 768, Aug. 28, 1980, pp. 1–3.

RFC 793, *Transmission Control Protocol, DARPA Internet Program Protocol Specification,* Sep. 1981, pp. 1–68.

Case, J. et al., *A Simple Network Management Protocol (SNMP),* RFC 1157, May 1990, pp. 1–26.

Sollins, K., *The TFTP Protocol (Revision 2),* RFC 1350, Jul. 1992, pp. 1–9.

Alexander, S., *DHCP Options and BOOTP Vendor Extensions,* RFC 2132, Mar. 1997, pp. 1–37.

"Radio Frequency Interface Specification (Interim Specification) SP–RFIv1.1–I03–991105", MCNS Holdings, L.P., 1999, pp. Ii to 366.

"Radio Frequency Interface Specification (Interim Specification) SP–RFI–I04–980724", MCNS Holdings, L.P., 1997, pp. ii to 196.

* cited by examiner

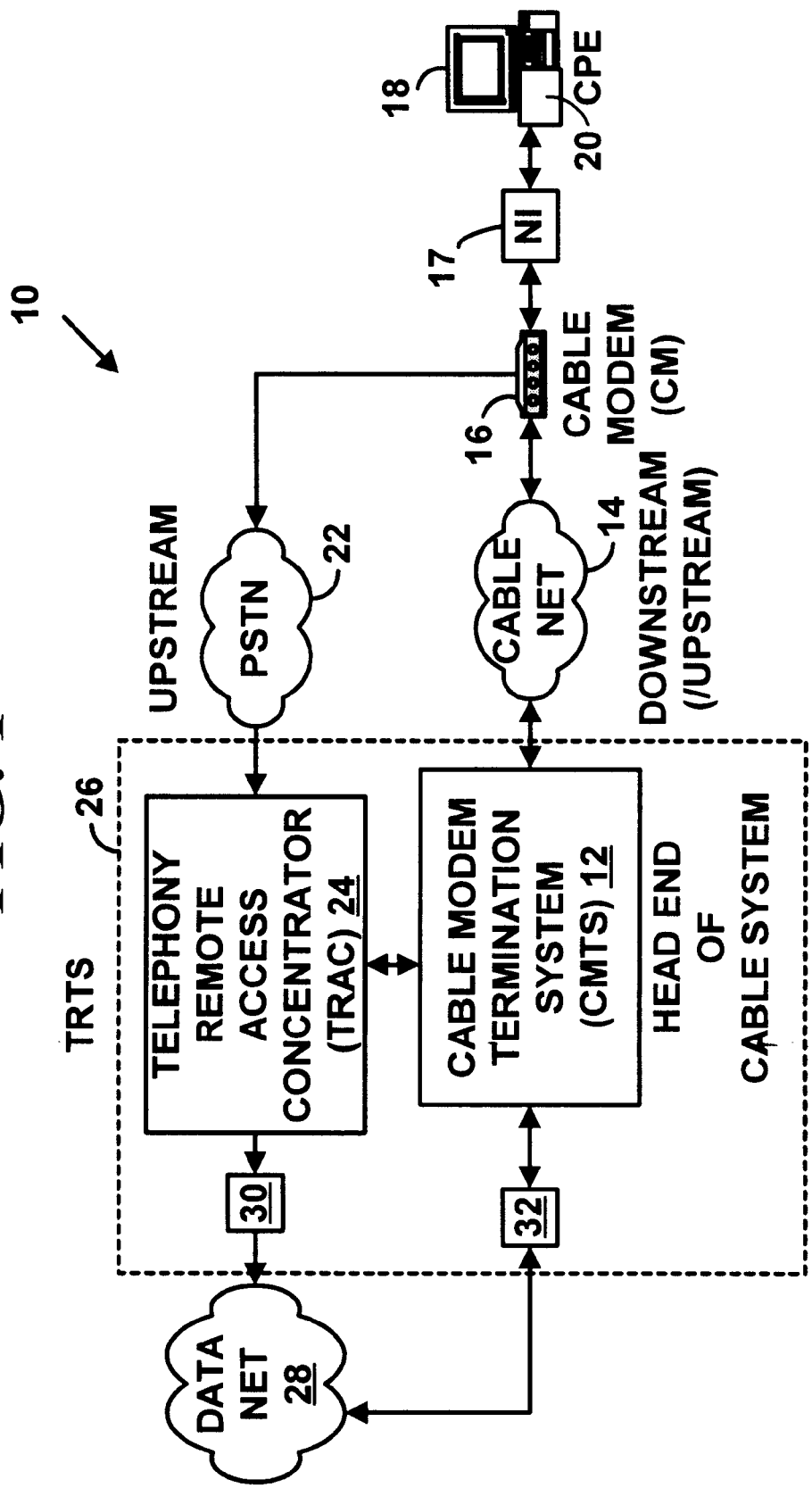

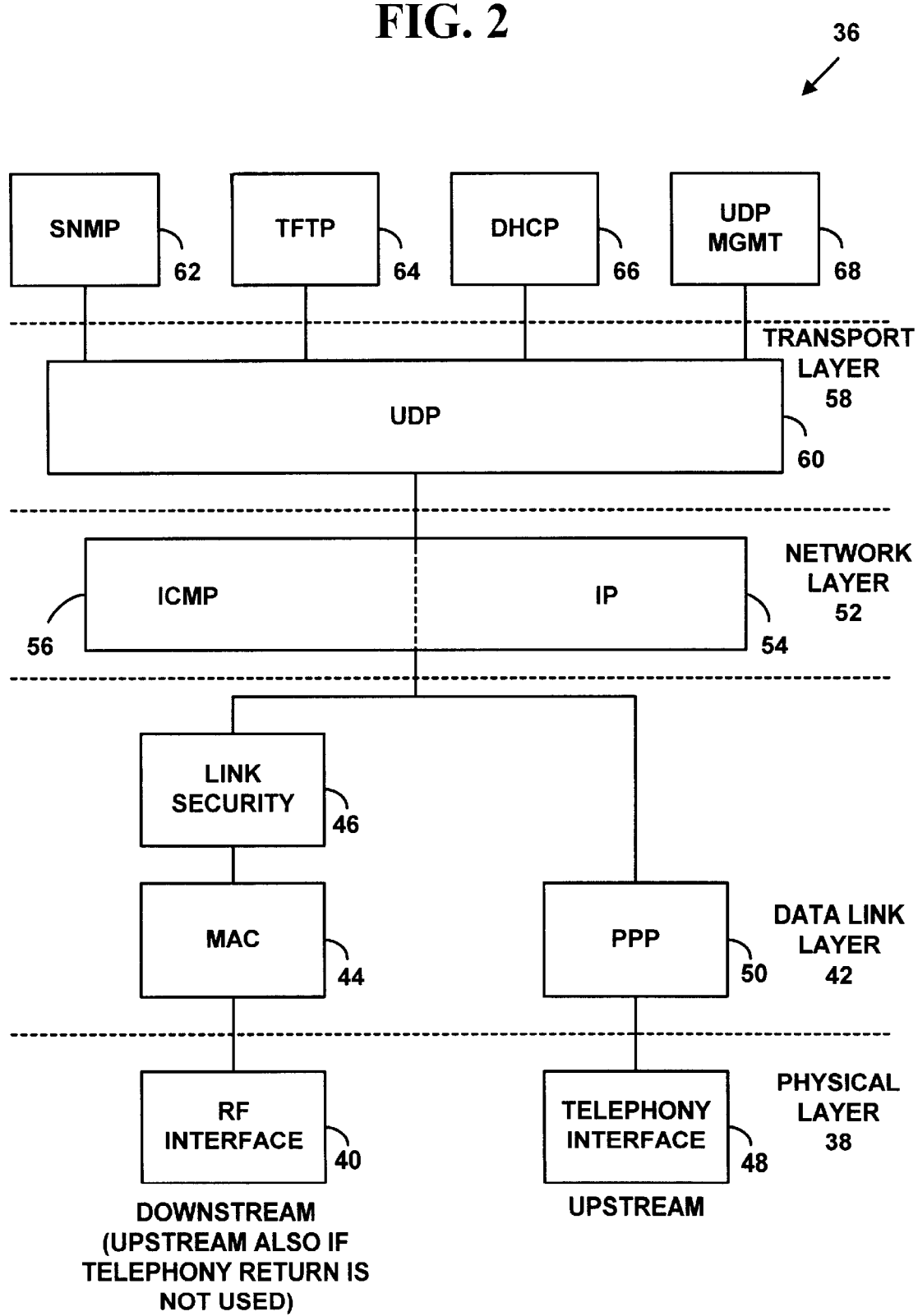

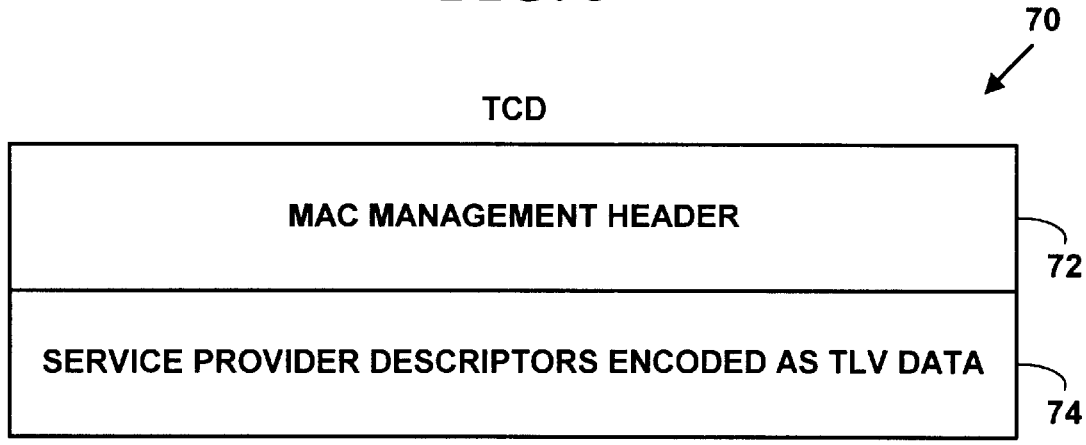
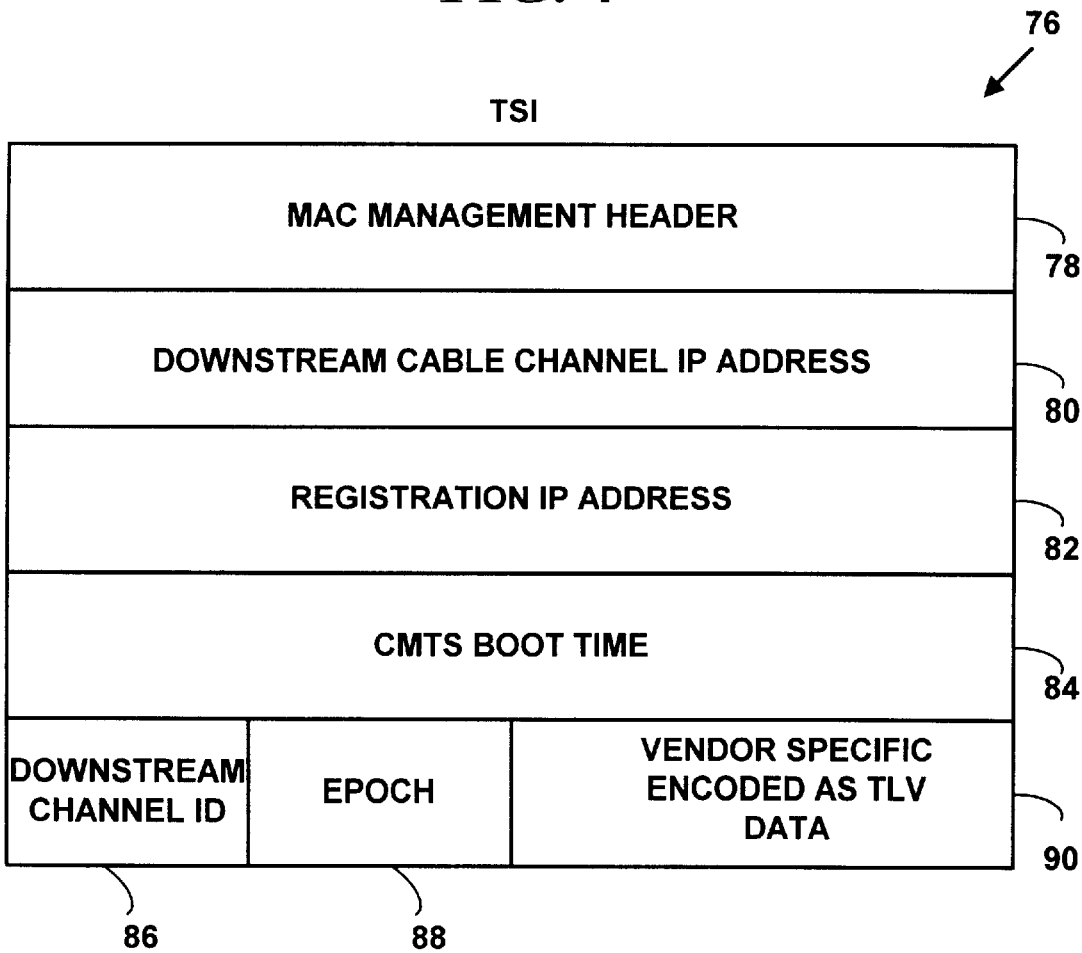

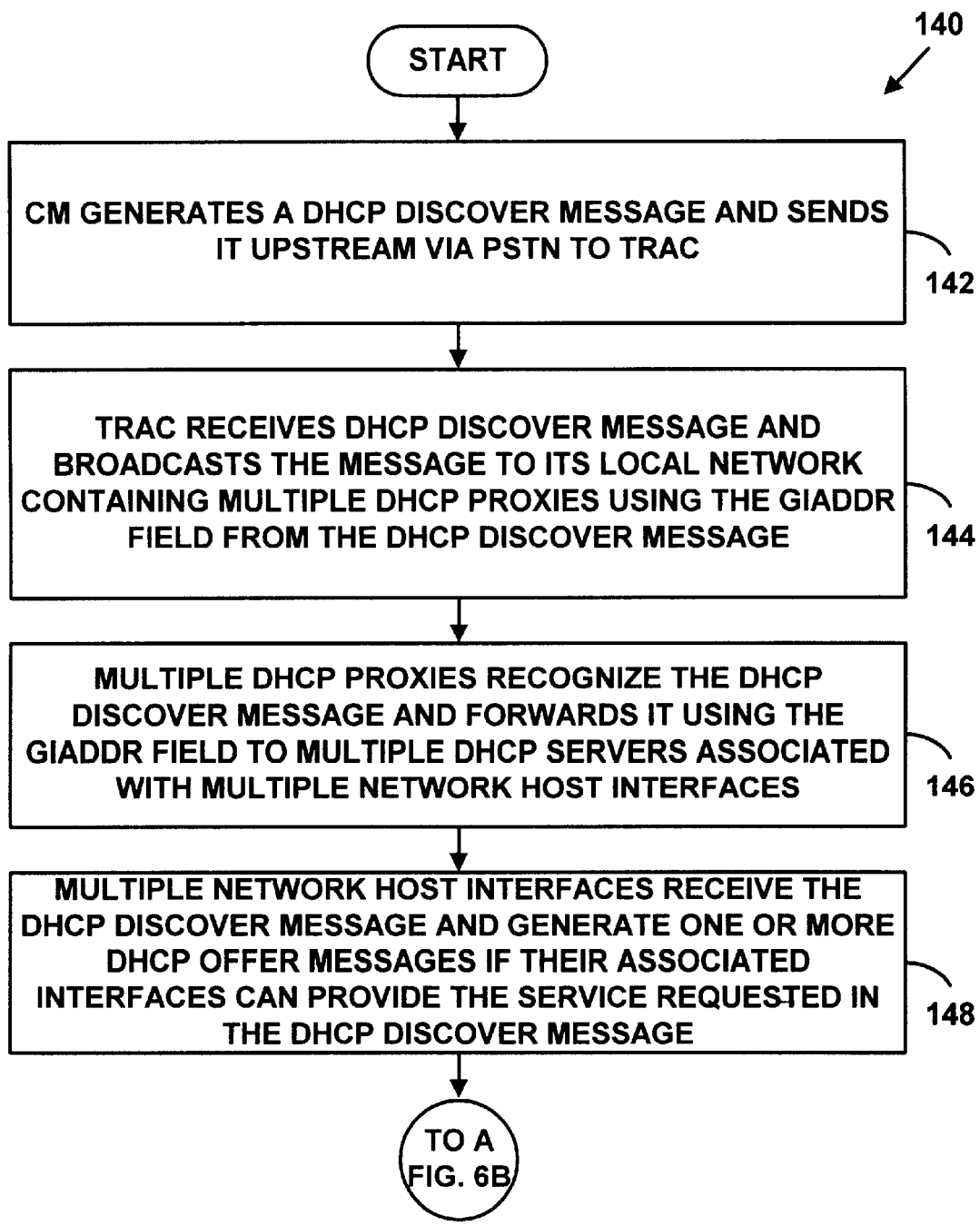

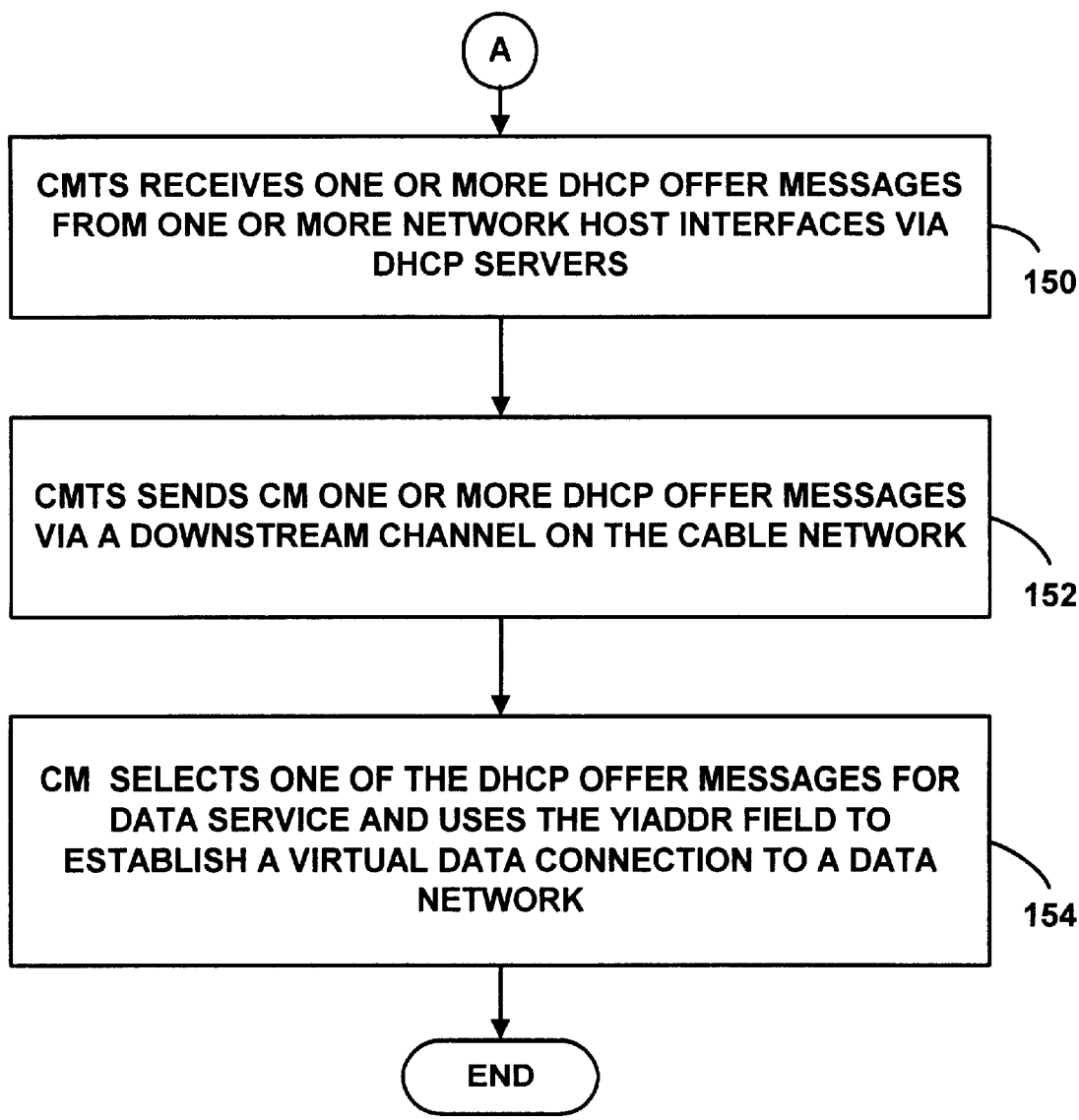

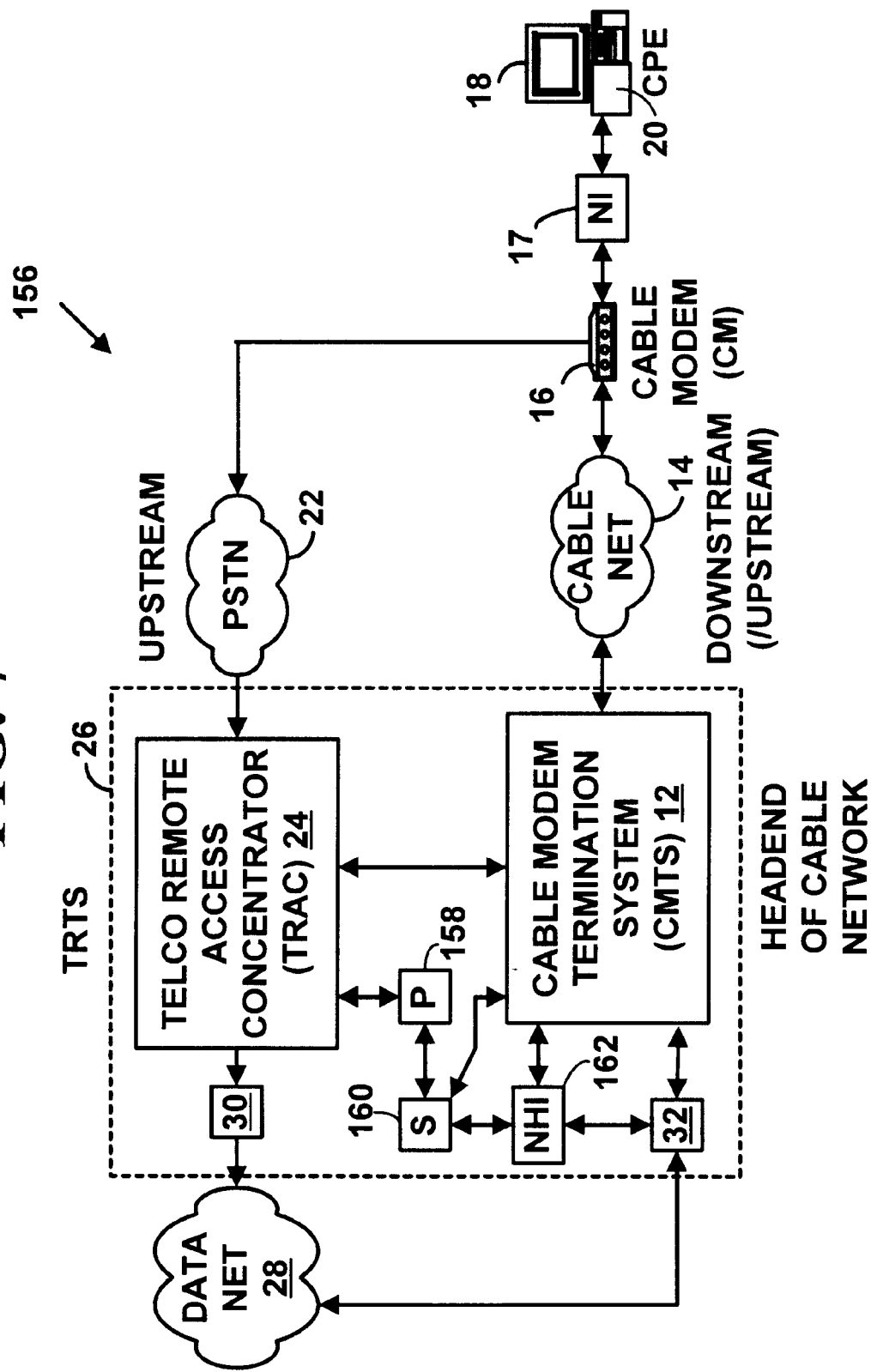

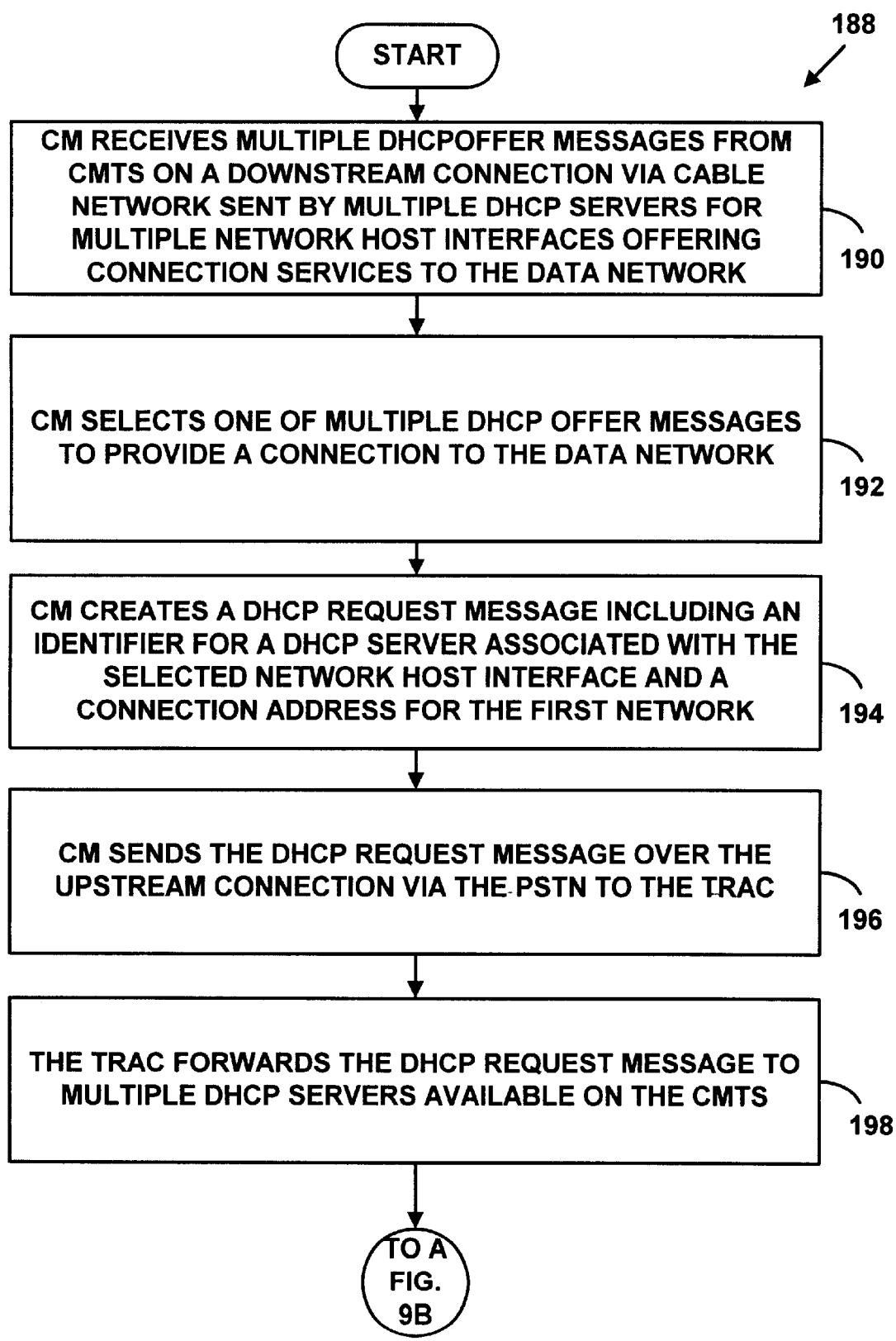

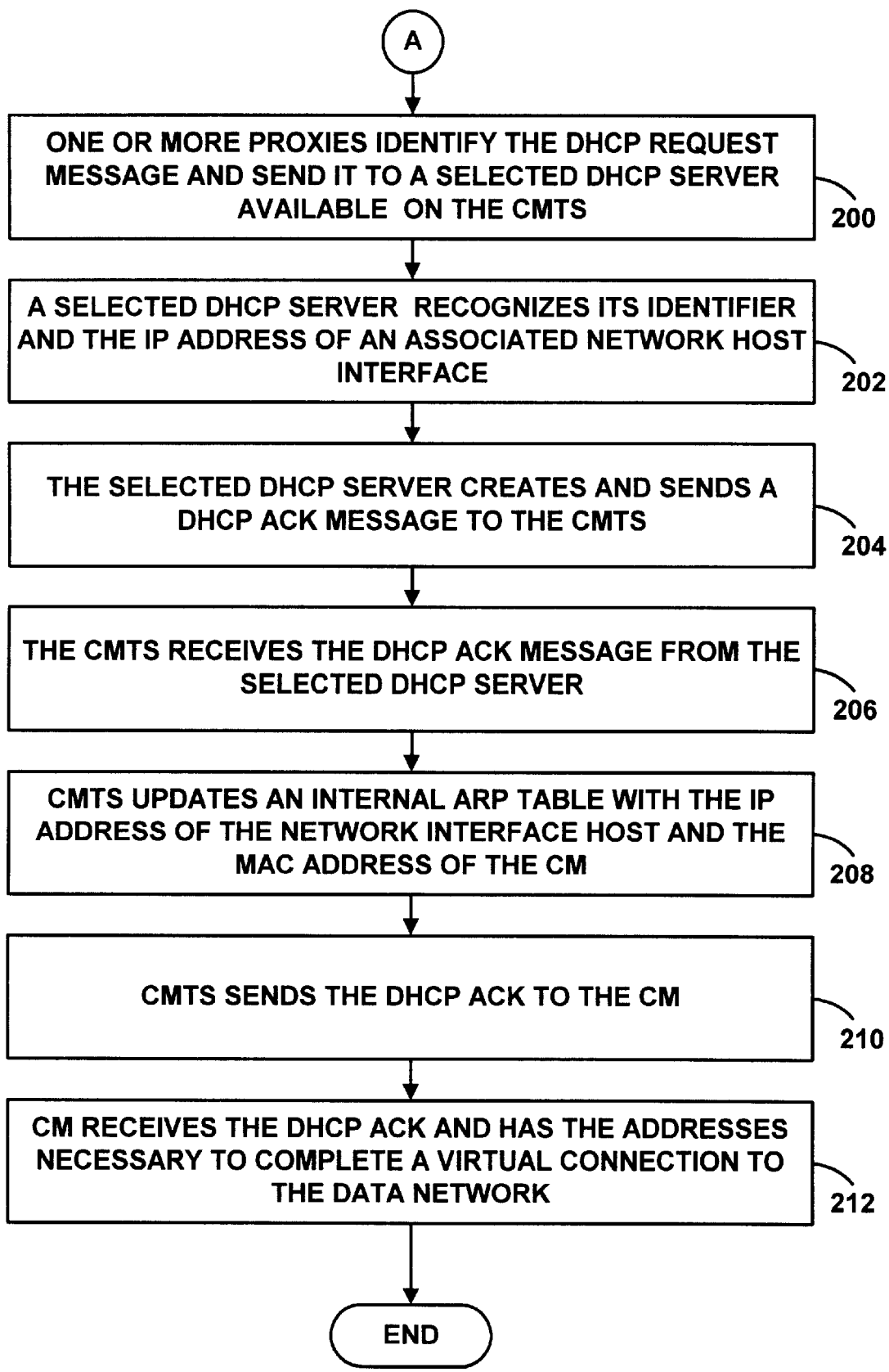

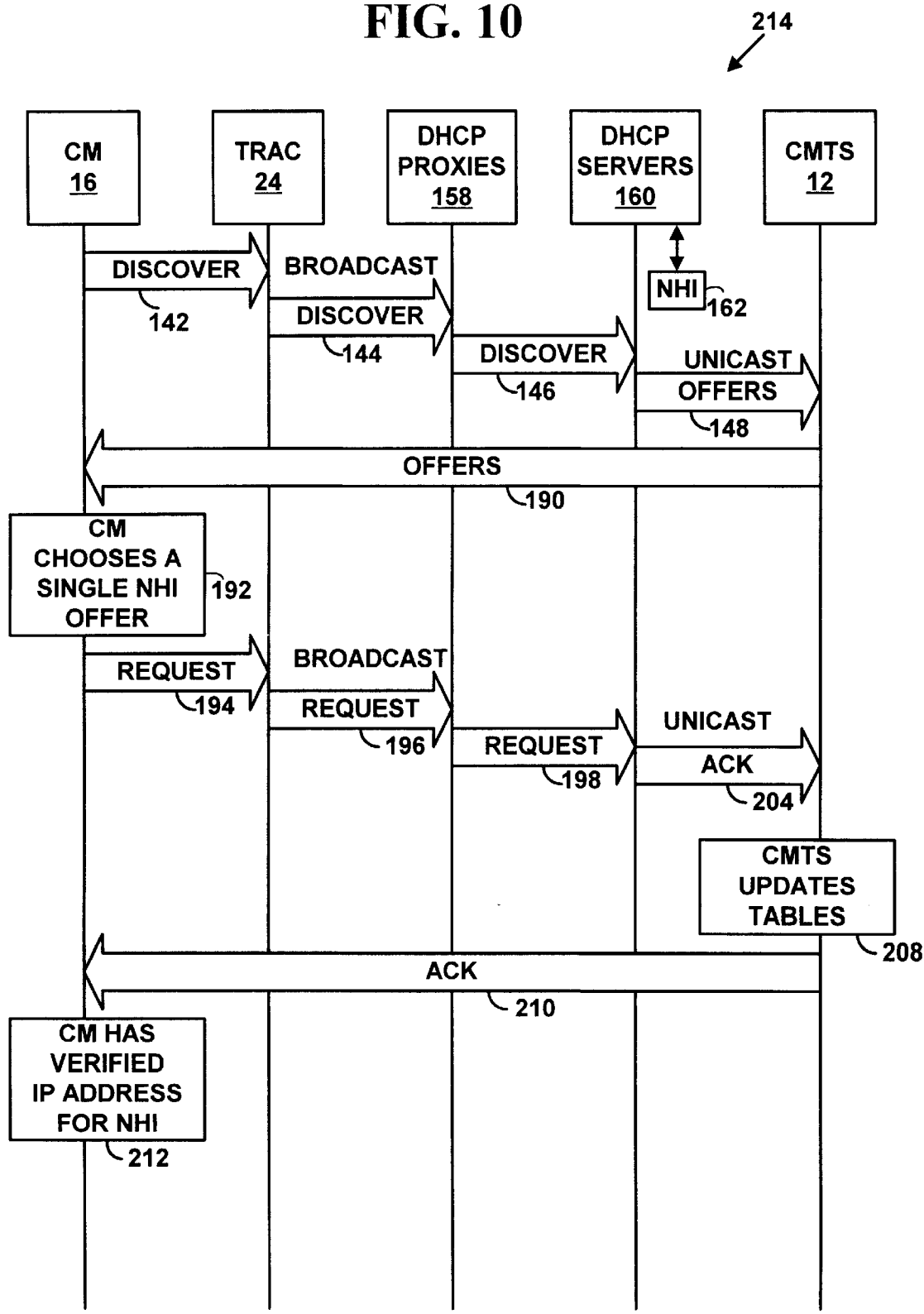

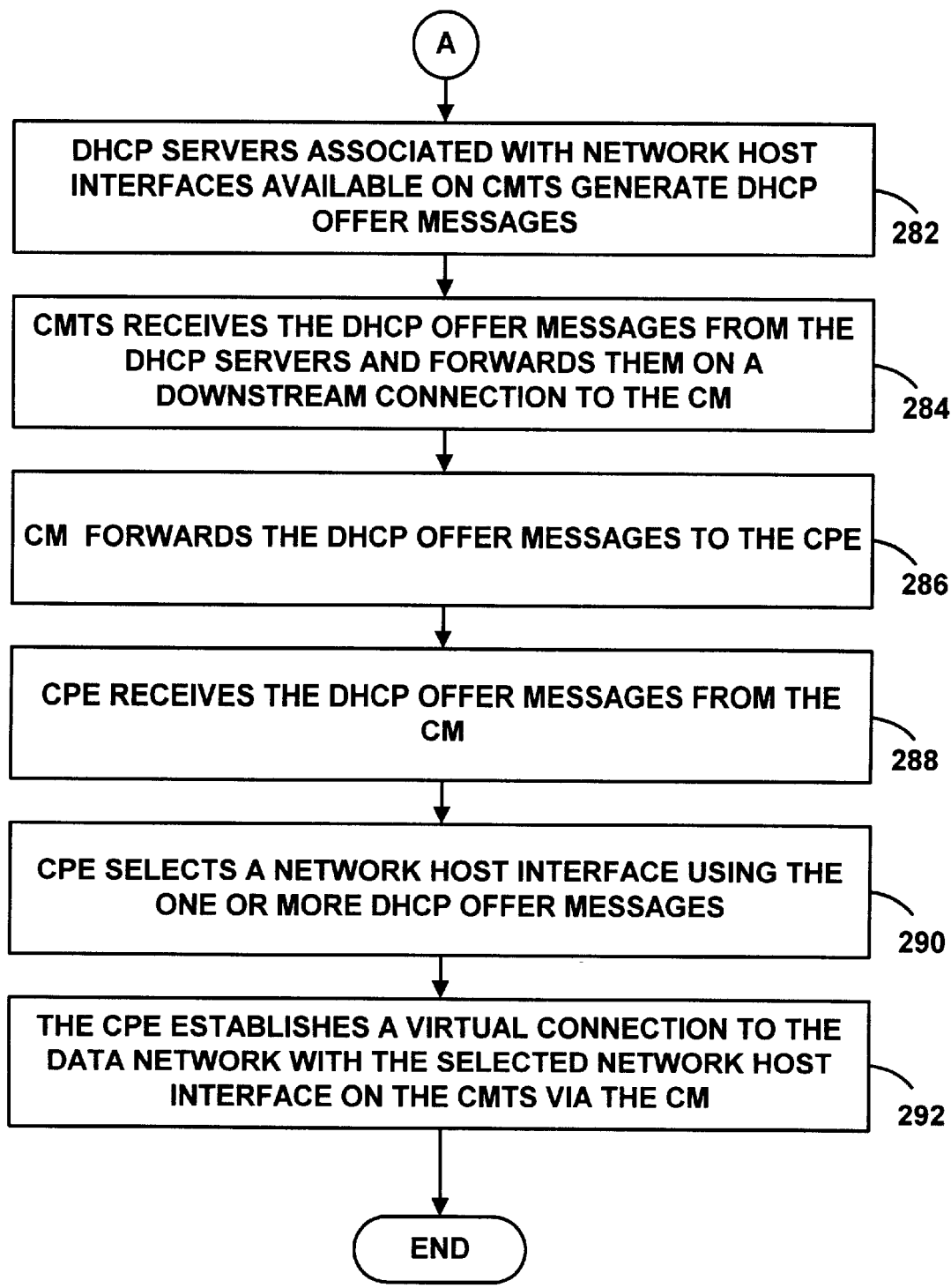

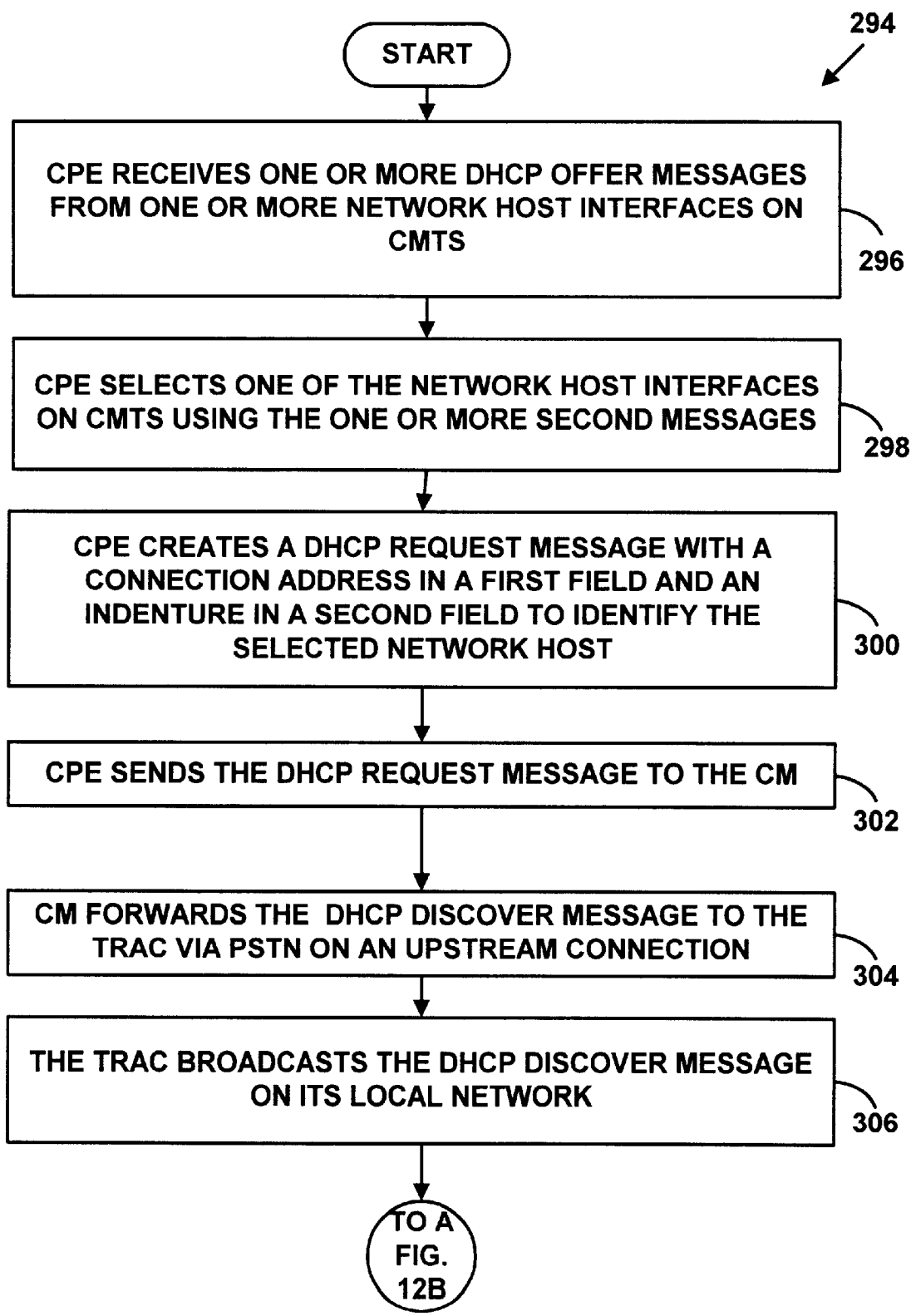

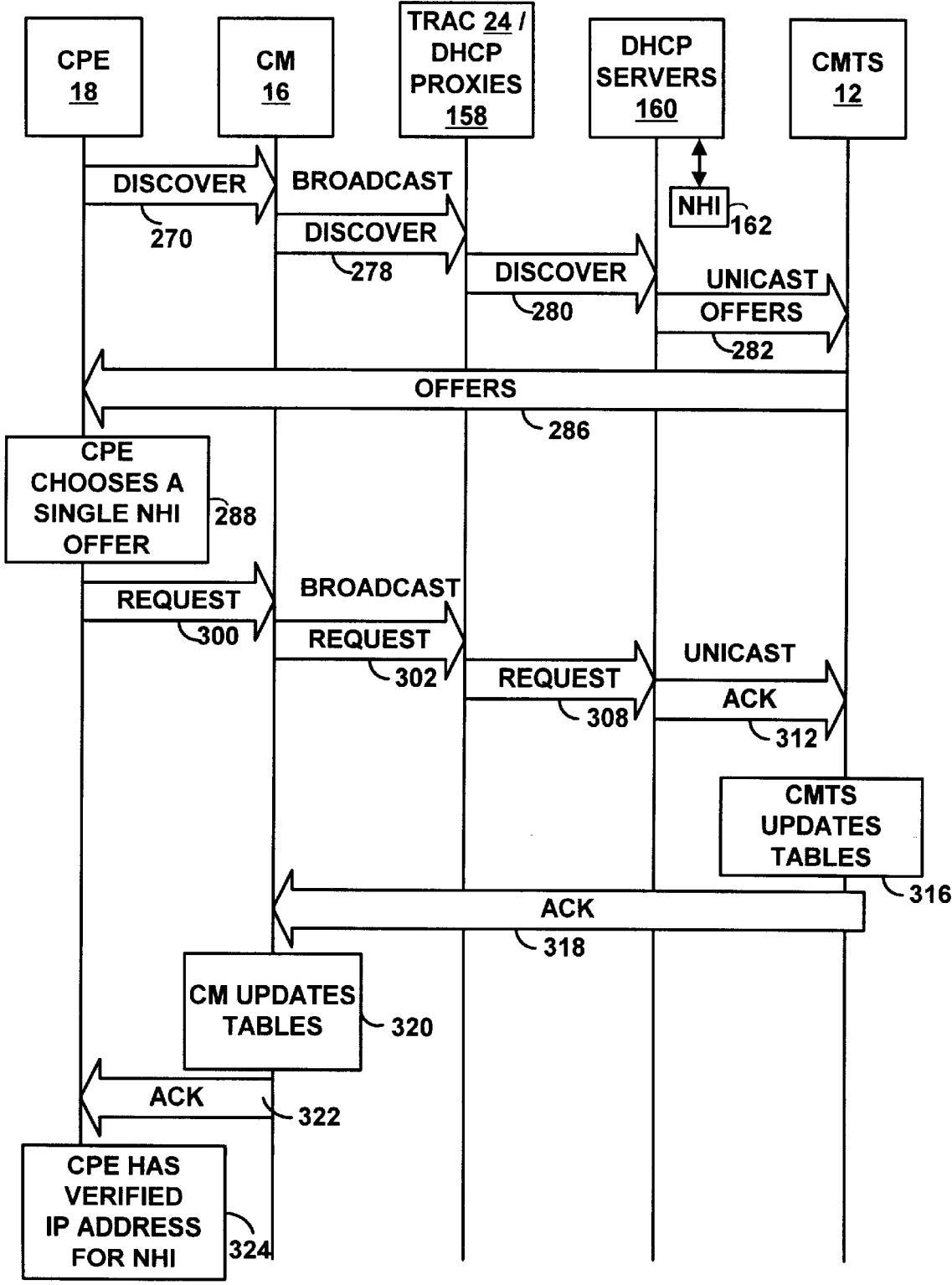

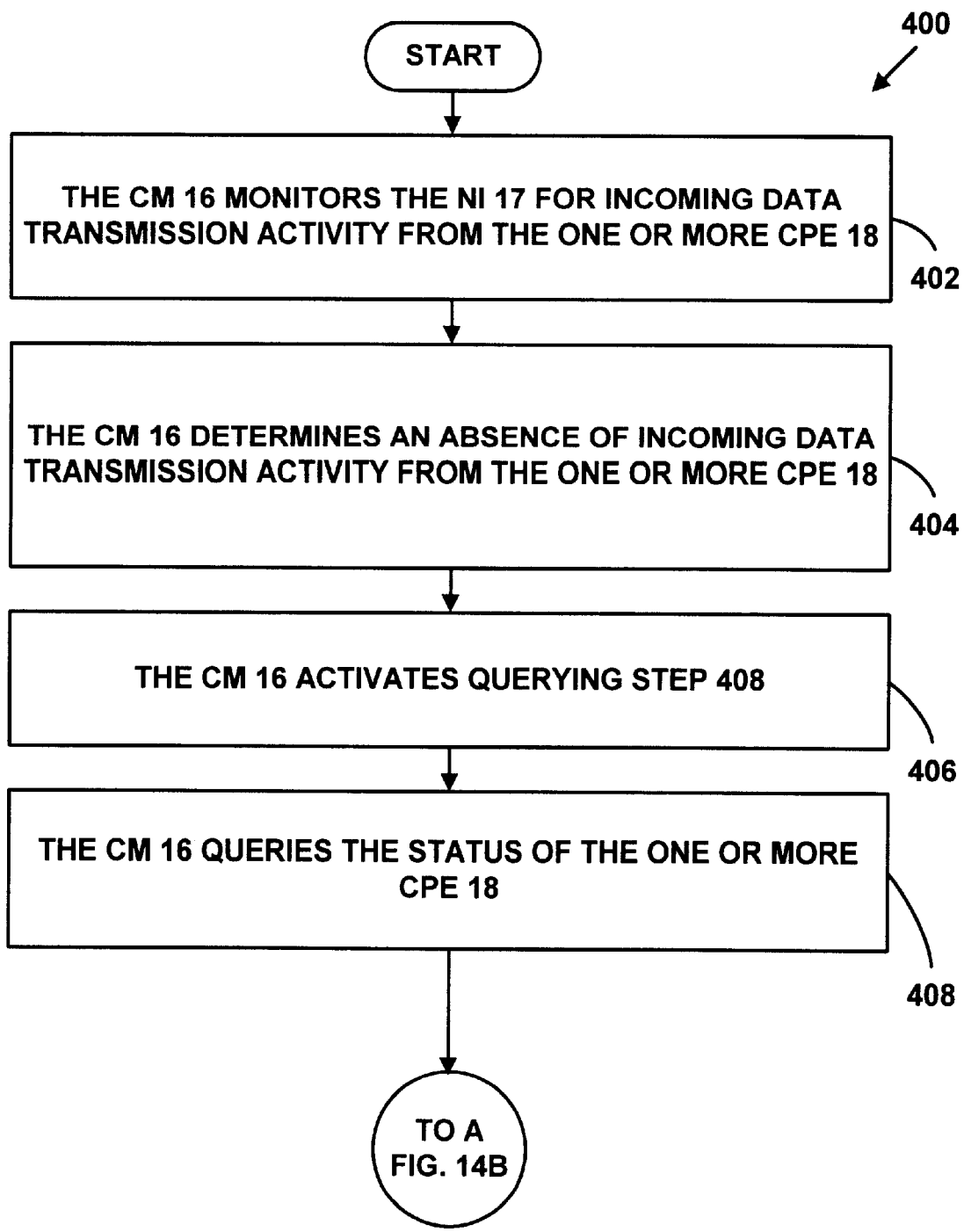

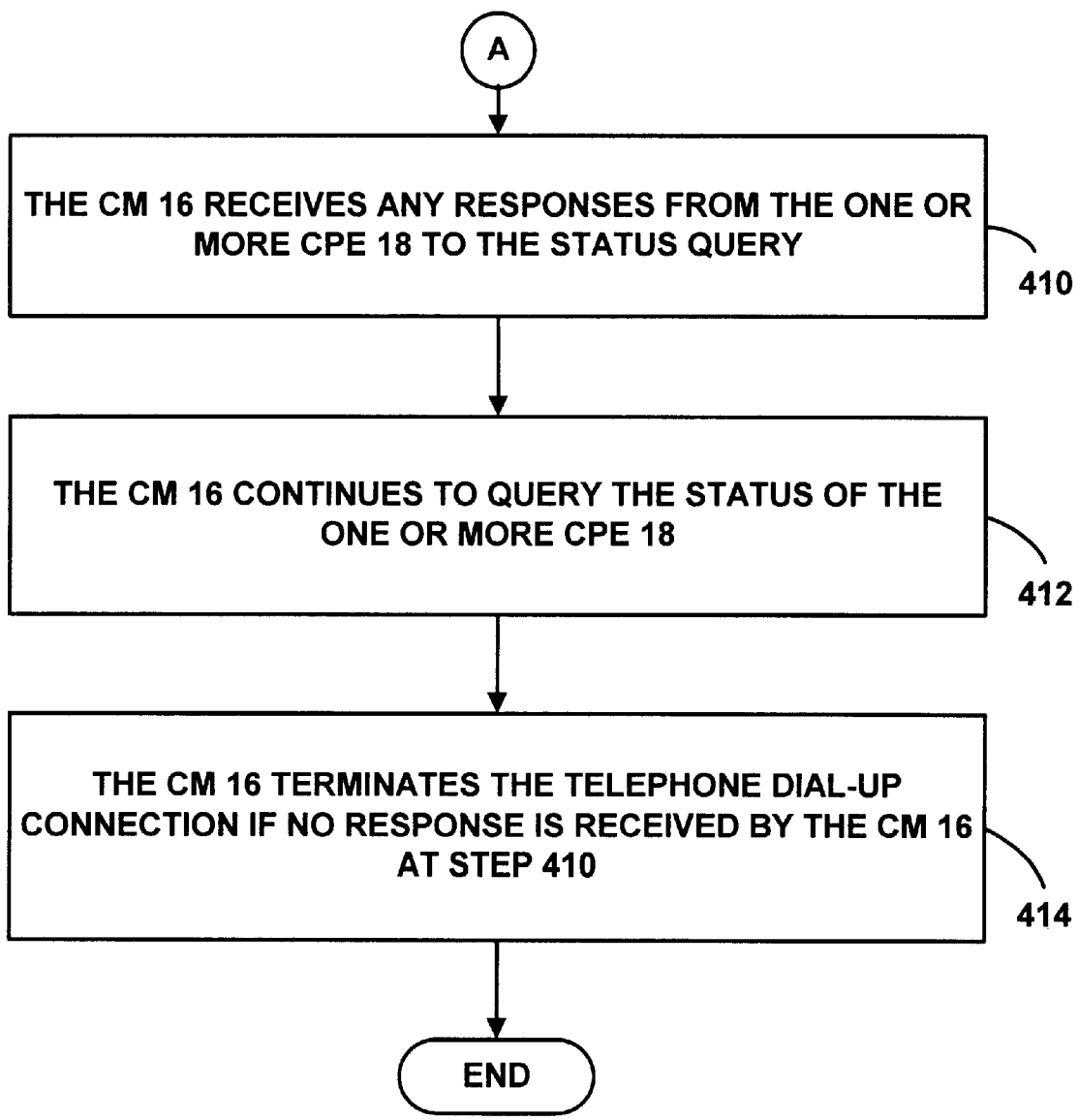

METHOD AND SYSTEM FOR AUTOMATIC LINK HANG UP

FIELD OF INVENTION

The present invention relates to communications access to digital computer networks. More specifically, it relates to how to automatically terminate a telephone uplink connection to a data network.

BACKGROUND OF THE INVENTION

Cable modems use existing cable television connections to provide high-speed connections to access digital computer networks such as the Internet. A user establishing a connection to access the Internet using a cable modem will receive web pages from the Internet via a high-speed downstream connection from the cable television network headend system. A cable television network headend is a central location that is responsible for sending cable signals in a downstream direction. The cable television network headend also receives web pages from the Internet and forwards the web pages to the user's cable modem over the high-speed downstream connection. This is a typical data-over-cable system.

Depending on the particular cable television system and cable modem implementation, a user typically sends commands and requests to the Internet in one of two ways: either (1) via an upstream connection directly back through the cable television network headend, or (2) over a separate telephone dial-up connection through the public switched telephone network ("PSTN") to the cable television network headend. The latter case using a telephone dial-up connection through the PSTN is referred to as a data-over-cable system with telephony return.

A problem with using a data-over-cable system with a separate telephony return connection is coordinating the dropping of the telephone connection to the cable television network headend when the connection to the Internet is no longer being used. Although the user may no longer be using the connection, the cable modem may not be aware that the computer user has turned off the computer and is no longer using the telephone dial-up connection. The cable modem device itself also will not immediately drop the telephone line connection even when the user turns his or her computer off. The telephone dial-up connection to the cable television system is maintained with no activity from the user, all the while accumulating telephone charges and monopolizing the use of telephone line.

Typically, in a data-over-cable system with telephony return, the cable television network headend device sends an information message to the cable modem so that the cable modem can to initiate a telephone call, as directed by a computer attached to the cable modem, for example. The message contains an inactivity timeout value for a timer located on the cable modem. The cable modem regularly monitors its interface to the telephone line connection for outgoing data transmission activity. If the timer is activated, and if there is no outgoing activity monitored at the interface for the length of the inactivity timeout period, the cable modem will drop the telephone line connection. If outgoing activity is monitored, the inactivity timer is reset.

Two issues that arise are (1) the length of time set for the inactivity timeout and (2) the notion that any outgoing data activity on the telephone line will cause the inactivity timer to reset. The value for the inactivity timeout period as set by the cable television network headend may be of a significant duration, making it impossible for the cable modem to readily discern that a particular customer computer or consumer premise equipment has stopped transmitting and is no longer using its telephone line connection. Apart from the length of time for the timeout, the inactivity timer cannot narrowly focus on discerning that consumer premise equipment is no longer on-line or active. This is because the inactivity timer is reset by any outgoing activity at the telephone line interface. The cable modem, for example, may regularly update its network address more often than the length of the inactivity timer, so that, in theory, the telephone line connection will never be dropped due to inactivity.

SUMMARY OF THE INVENTION

In accordance with preferred embodiments of the present invention, some of the problems associated with using a telephone dial-up or uplink connection to a data network, such as with a cable modem using a telephone return line, are addressed.

The present invention includes a method of automatically terminating a telephone dial-up connection to a data network. A network device which utilizes the telephone dial-up connection to access the data network is provided. The network device has a network interface to one or more consumer premise equipment, or CPE. In accordance with the exemplary method, the network interface is monitored for incoming data transmission activity and an absence of incoming activity is determined. The one or more CPE are queried for their status, and any responses to the query from the one or more CPE are received. If no response is received from at least one of the one or more CPE, the telephone dial-up connection is terminated.

A further embodiment of the present invention includes a system for automatically terminating a telephone dial-up connection to a data network, having a network device, a network interface, one or more CPE, a querying process, and preferably a termination process. The network device utilizes the telephone dial-up connection to transmit data to the data network. The one or more CPE utilize the network device via the network interface to transmit data over the telephone dial-up connection. The querying process queries the status of the one or more CPE and, preferably, determines whether the network device is no longer being utilized by the one or more CPE to transmit data over the telephone dial-up connection. Preferably, the termination process terminates the telephone dial-up connection if the network device is no longer being utilized by the one or more CPE.

A preferred embodiment of the present invention attempts to address some of the problems in automatically and locally terminating a telephone dial-up connection in a data-over-cable system with telephony return. A cable modem is connected on an upstream telephone dial-up connection to a data network such as the Internet. The cable modem monitors a network interface for incoming data transmission activity from consumer premise equipment, including a personal computer system, connected to the cable modem. If the cable modem determines no incoming data transmission activity, the cable modem begins to query the status of the consumer premise equipment. If the consumer premise equipment does not respond to repeated queries within a specified time, the cable modem terminates the telephone dial-up connection.

Presented is a cable modem device that automatically drops a telephone line connection more quickly than as directed by the inactivity timeout set by the cable television network headend. A user who turns his or her computer off or no longer wishes to connect to the Internet will be able to use his or her telephone line for other purposes more immediately and will be more likely to decrease his or her telephone usage charges than under the present cable modem termination system.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 1 is a block diagram illustrating a cable modem system with telephony return;

FIG. 2 is a block diagram illustrating a protocol stack for a cable modem;

FIG. 3 is a block diagram illustrating a Telephony Channel Descriptor message structure;

FIG. 4 is a block diagram illustrating a Termination System Information message structure;

FIGS. 6A and 6B are a flow diagram illustrating a method for discovering hosts in a cable modem system;

FIG. 7 is a block diagram illustrating a data-over-cable system for the method illustrated in FIGS. 6A and 6B;

FIGS. 9A and 9B are a flow diagram illustrating a method for resolving discovered host addresses; and FIG. 10 is a block diagram illustrating the message flow of the method illustrated in FIGS. 9A and 9B;

FIGS. 11A and 11B are a flow diagram illustrating a method for addressing network host interfaces from customer premise equipment;

FIGS. 12A and 12B are a flow diagram illustrating a method for resolving network host interfaces from customer premise equipment;

FIG. 13 is a block diagram illustrating a message flow for the methods in FIGS. 11A, 11B, and 12A and 12B;

FIGS. 14A and 14B are a flow diagram illustrating a method for automatically terminating a telephone dial-up connection to a data network;

DETAILED DESCRIPTION OF PREFERRED EMBODIMENTS

Exemplary Data-over-cable System

Figure 5:
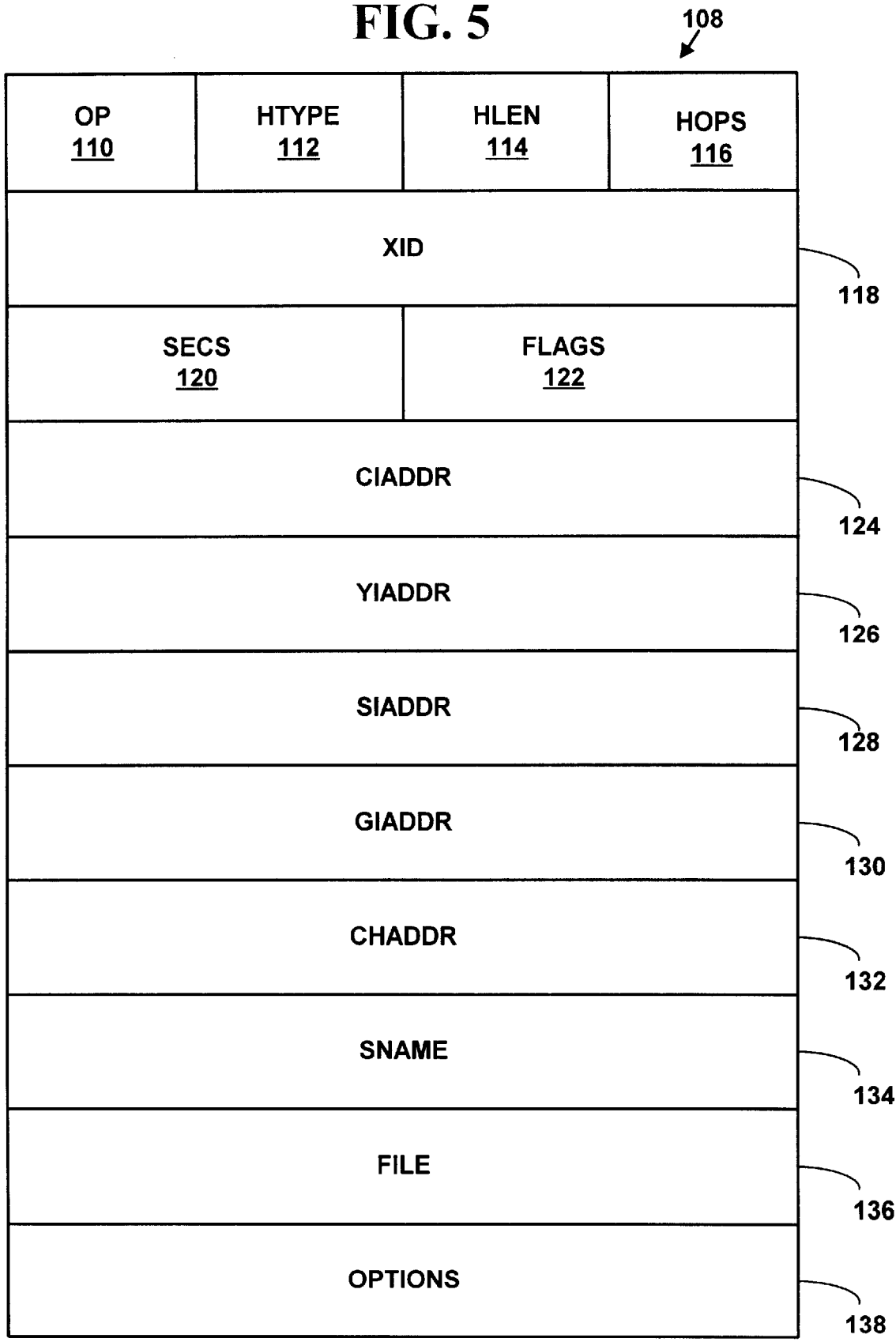
FIG. 5 is a block diagram illustrating a Dynamic Host Configuration Protocol message structure.

FIG. 1 is a block diagram illustrating an exemplary data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. The present invention is not limited to a data-over-cable system with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one CM 16. However, in a typical data-over-cable system, tens or hundreds of thousands of the CMs 16 are connected to the CMTS 12. The CM 16 is connected to Customer Premise Equipment ("CPE") 18 such as a personal computer system via a Cable Modem-to-CPE Interface ("CMCI") 20.

One CPE 18 is illustrated in FIG. 1. In another preferred embodiment of the present invention, a Network Interface ("NI") 17 connects the CM 16 to one CPE 18 via a CMCI 20. The NI 17 may also include the CMCI 20. In other embodiments, the CM 16, NI 17, CMCI 20, and CPE 18 are all embodied in the same package. Similarly, the CM 16 may have multiple CPE 18 attached (Not illustrated in FIG. 1). Preferably, the NI 17 will connect the multiple CPE 18 to the CM 16 via multiple CMCI 20. The NI 17 may also include the multiple CMCI 20. One NI 17 is illustrated in FIG. 1. However, the CM 16 may have multiple NI 17 attached (Not illustrated in FIG. 1).

In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U. S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24.

In another preferred embodiment of the present invention, in a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without telephony return. The present invention is not limited to cable modems used with telephony return.

In one preferred embodiment of the present invention of the telephony return, the TRAC 24 is a Total Control Telephony Hub by 3Com Corporation of Santa Clara, Calif. One exemplary TRAC 24 as a Total Control Telephony hub is described in U.S. Pat. No. 5,528,595, granted to Dale M.Walsh et al., and incorporated herein by reference. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content servers, operations servers, administrative servers and maintenance servers used in data-over-cable system 10 (not shown in FIG. 1) may also be in different locations. Access points to the data-over-cable system 10 are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used. The present invention may also be used in a data-over-cable system 10 with, or without telephony return.

Network Device Protocol Stack

FIG. 2 is a block diagram illustrating a protocol stack 36 for network devices in data-over-cable system 10. FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, network devices including the CM 16 are connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method, such as Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies and modulation methods could also be used (e.g., Quadrature Phase Shift Keying ("QPSK") modulation). For more information on the RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above the RF interface 40 in a data-link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The link security protocol stack 46 prevents unauthorized users from making a data connection from cable network 14. The RF interface 40 and the MAC layer 44 can also be used for an upstream cable connection in a data-over-cable system 10 without telephony return.

For upstream data transmission with telephony return, the CM 16 is connected to the PSTN 22 in physical layer 38 via telephony interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as telephony interface 48. As is known in the art, ITU-T V.34 is commonly used in the data link layer for modem communications and currently allows data rates as high as 33,600 bits-per-second ("bps"). For more information see the ITU-T V.34 standard. However, modem interfaces (e.g., V.90) or other telephony interfaces could also be used. For example, an Asymmetric Digital Subscribe Link ("ADSL") or an Integrated Services Digital Network ("ISDN") telephony interface could also be used for the telephony interface 48.

Above the telephony interface 48, in the data link layer 42, is a Point-to-Point Protocol ("PPP") layer 50, hereinafter PPP 50. As is known in the art, PPP 50 is used to encapsulate network layer datagrams over a serial communications link. For more information on PPP, see Internet Engineering Task Force ("IETF") Request for Comments ("RFC"), RFC- 1661, RFC-1662 and RFC-1663, incorporated herein by reference. Information for IETF RFCs can be found on the World Wide Web at URLs "ds.internic.net" or "www.ietf org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see, RFC-791, incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see, RFC-971, incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see, RFC-768, incorporated herein by reference. Transmission Control Protocol ("TCP") may also be used in the transport layer 58. For more information on TCP see, RFC-793, incorporated by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see, RFC-1157, incorporated herein by reference. TFTP layer 64 is a file transfer protocol used to download files and configuration information. For more information on TFTP layer 64 see, RFC-1350, incorporated herein by reference. The DHCP layer 66 is a protocol for passing configuration information to hosts on an IP 54 network. For more information on the DHCP layer 66 see, RFC-1541, and RFC-2131, incorporated herein by reference. UDP manager 68 distinguishes and routes packets to an appropriate service (e.g., a virtual tunnel). More or fewer protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for the CMTS 12, the CM 16, the CPE 18, and other network devices of the present invention includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC 44 management message with a management type value of TRI_TCD at a periodic interval (e.g., every 2 seconds). To provide for flexibility, the TCD message parameters are encoded in a Type/Length/Value ("TLV") form. However, other encoding techniques could also be used.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by the CM 16 to initiate a telephone call. The SPD 74 is a TLV-encoded data structure that contains sets of dialing and access parameters for the CM 16 with telephony return. The SPD 74 is contained within TCD message 70. There may be multiple SPD 74 encodings within a single TCD message 70. There is at least one SPD 74 in the TCD message 70. The SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE (1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . .). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will use during authentication over a telephone link during the initialization procedure. Format is a monolithic sequence of alphanumeric characters in an ASCII string composed of numbers and letters. |
| Login Password | This contains a password that the CM 16 will use during authentication over a telephone link during the initialization procedure. Format is a monolithic sequence of alpha-numeric characters in an ASCII string composed of numbers and letters. |
| DHCP 66 Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP 66 Server | IP 54 address value of a DHCP 66 Server the CM 16 uses for DHCP 66 Client and BOOTP Relay Process. If this attribute is present and DHCP 66 Authenticate attribute is TRUE (1). The default value is integer zero. |

TABLE 1-continued

| SPD 74 Parameter | Description |
| --- | --- |
| RADIUS Realm | The realm name is a string that defines a Remote Authentication Dial In User Service ("RADIUS") server domain. Format is a monolithic sequence of alphanumeric characters in an ACSII string composed of numbers and letters. |
| PPP 50 Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report CMTS 12 information to the CM 16 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of TRI_TSI.

FIG. 4 is a block diagram of a TSI message structure 76. The TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

Descriptions of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either reinitialized or performs address or routing table flush. |
| Vendor Specific Extensions 90 | Optional vendor extensions may be added as TLV encoded data. |

If telephony return is being used, after receiving the TCD 70 message and the TSI message 76, the CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24. Once LCP negotiation is complete, the CM 16 requests Internet Protocol Control Protocol ("IPCP") address negotiation for an upstream telephony return path. For more information on IPCP see, RFC-1332, incorporated herein by reference. During IPCP negotiation, the CM 16 negotiates an IP 54 address with the TRAC 24 for sending IP 54 data packet responses back to data network 28 via the TRAC 24, via PPP 50.

When the CM 16 has established an upstream IP 54 link to TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from data network 28 via the CMTS 12 and cable network 14, and send return data to data network 28 via TRAC 24 and PSTN 22. The CM 16 must first determine an address of a host interface (e.g., an IP 54 interface) available on the CMTS 12 that can be used by data network 28 to send data to the CM 16. In one preferred embodiment of the present invention, the CM 16 has only a downstream cable connection from the CMTS 12 and will obtain a connection address to the data network 28 using an upstream telephony connection to the TRAC 24. In another preferred embodiment of the present invention, the CM 16 will obtain a connection address to the cable network 14 using an upstream cable connection to the CMTS 12.

An exemplary data path through cable system 10 is illustrated in Table 3. However other data paths could also be used and the present invention is not limited to the data paths shown in Table 3. For example, the CM 16 may send data upstream back through the cable network 14 (e.g., the CM 16 to cable network 14 to the CMTS 12) and not use the PSTN 22, the TRAC 24, or the telephony return upstream path at all.

TABLE 3

1. An IP 54 datagram from data network 28 destined for the CM 16 arrives on the CMTS-NSI 32 and enters the CMTS 12.
2. CMTS 12 encodes the IP 54 datagram in a cable data frame, passes it to MAC 44 and transmits it "downstream" to RF interface 40 on the CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with telephony interface 48 via the PSTN 22 to TRAC 24.
5. TRAC 24 decodes the IP 54 datagram and forwards it via TRAC-NSI 30 to a destination on data network 28.

Dynamic Network Host Configuration on a Data-over-cable System

As was illustrated in FIG. 2, the CM 16 includes a Dynamic Host Configuration Protocol ("DHCP") layer 66, hereinafter the DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. The DHCP 66 is built on a client-server model, where designated DHCP 66 servers allocate network host addresses and deliver configuration parameters to dynamically configured network host clients.

FIG. 5 is a block diagram illustrating an exemplary DHCP 66 message structure 108. The format of the DHCP 66 messages is based on the format of BOOTstrap Protocol ("BOOTP") messages described in RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to the network host clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 servers use a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for exemplary DHCP 66 message 108 fields are shown in Table 4.

TABLE 4

| DHCP 66 Parameter | Description |
| --- | --- |
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your' (client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |

TABLE 4-continued

| DHCP 66 Parameter | Description |
| --- | --- |
| FILE 136 | Boot file name, terminated by a null string. |
| OPTIONS 138 | Optional parameters. |

The DHCP 66 message structure shown in FIG. 5 is used to discover IP 54 and other network host interfaces in data-over-cable system 10. A network host client (e.g., the CM 16) uses the DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.
2. DHCP 66 servers may respond with a DHCPOFFER message that includes an available network address in the 'yiaddr' field (and other configuration parameters in DHCP 66 options) from a network host interface. DHCP 66 servers unicast the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering Network Host Interfaces in the Data-over-cable System

The DHCP 66 discovery process illustrated in Table 5 will not work in data-over-cable system 10 with or without telephony return. In an exemplary preferred embodiment of the present invention with telephony return, the CM 16 discovers network host interfaces via TRAC 24 and the PSTN 22 on an upstream telephony connection. In another exemplary preferred embodiment of the present invention without telephony return, the CM 16 discovers network host interfaces via the CMTS 12 on an upstream cable connection.

The DHCP 66 addressing process shown in Table 5 was not originally intended to discover network host interfaces for a system like the data-over-cable system 10. The CMTS 12 has DHCP 66 servers associated with network host interfaces (e.g., IP 54 interfaces). However, in one preferred embodiment of the present invention with telephony return, the CM 16 only has as downstream connection from the CMTS 12. The CM 16 has an upstream connection to TRAC 24, which has a DHCP 66 layer. However, TRAC 24 does not have the DHCP 66 servers, or direct access to network host interfaces (e.g., IP 54 interfaces) associated with the CMTS 12.

FIGS. 6A and 6B are a flow diagram illustrating a Method 140 for discovering network host interfaces in data-over-cable system 10. In one preferred embodiment of the present inventions with telephony return, after the CM 16 has established an IP 54 link to TRAC 24, via PPP 50, it begins communications with the CMTS 12 via DHCP 66 to complete a virtual IP 54 connection with the data network 28. However, to discover what IP 54 host interfaces might be available on the CMTS 12, the CM 16 has to communicate with the CMTS 12 via an upstream telephony connection to the PSTN 22 and the TRAC 24 since the CM 16 only has a "downstream" cable channel from the CMTS 12 in a data-over-cable system with telephony return.

At Step 142 in FIG. 6A, after receiving a TSI message 76 from the CMTS 12 on a downstream cable connection, the CM 16 generates a DHCP discover ("DHCPDISCOVER") message and sends it upstream via an upstream telephony connection to the PSTN 22 and the TRAC 22 to discover what IP 54 interfaces are associated with the CMTS 12. The fields of the DHCP 66 discover message are set as illustrated in Table 6. However, other field settings may also be used.

TABLE 6

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP 54 address, the IP 54 address is placed in this field. If the CM 16 has previously been assigned an IP 54 address by the DHCP 66, and also has been assigned an address via IPCP, the CM 16 places the DHCP 66 IP 54 address in this field. |
| GIADDR 130 | CM 16 places the Downstream Channel IP 54 address 80 of the CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more network host interfaces (e.g., IP 54 host interfaces), associated with the CMTS 12. The DHCP 66 giaddr-field 130 (FIG. 5) includes a downstream channel IP address 80 of the CMTS 12 obtained in TSI message 76. Using the downstream channel IP address 80 of the CMTS 12 obtained in TSI message 76 allows the DHCPDISCOVER message to be forwarded by TRAC 24 to the DHCP 66 servers (i.e., protocol servers) associated with network host interfaces associated with the CMTS 12. If the DHCP 66 giaddr-field 130 (FIG. 5) in a DHCP message from a DHCP 66 client is non-zero, a DHCP 66 server sends any return messages to a DHCP 66 server port on a DHCP 66 relaying agent (e.g., the CMTS 12) whose address appears in the DHCP 66 giaddr-field 130.

In a typical DHCP 66 discovery process, the DHCP 66 giaddr-field 130 is set to zero. However, in one preferred embodiment of the present invention, the DHCP 66 giaddr-field 130 contains the IP address 80 of the CMTS 12. If the DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124 (FIG. 5), or to a client's hardware address (e.g., MAC address 44) specified in the DHCP 66 chaddr-field 132 (FIG. 5) or to a local subnet broadcast address (e.g., 255.255.255.255). If the DHCP 66 giaddr-field 130 is non-zero, a relay agent is being used (e.g., the CMTS 12).

At Step 144, a DHCP 66 layer on TRAC 24 broadcasts the DHCPDISCOVER message on its local network leaving the DHCP 66 giaddr-field 130 intact since it already contains a non-zero value. TRAC's 24 local network includes connections to one or more DHCP 66 proxies (i.e., network host interface proxies). The DHCP 66 proxies accept the DHCP 66 messages originally from the CM 16 destined for DHCP 66 servers associated with network host interfaces associated with the CMTS 12. The TRAC 24 has no direct access to DHCP 66 servers associated with network host interfaces associated with the CMTS 12. The DHCP 66 proxies are not used in a typical the DHCP 66 discovery process known in the art.

One or more DHCP 66 proxies on TRAC's 24 local network recognizes the DHCPDISCOVER message and forwards it to one or more DHCP 66 servers associated with network host interfaces (e.g., IP 54 interfaces) associated with the CMTS 12 at Step 146. Since the DHCP 66 giaddr-field 130 (FIG. 5) in the DHCPDISCOVER message sent by the CM 16 is already non-zero (i.e., contains the downstream IP address of the CMTS 12), the DHCP 66 proxies also leave the DHCP 66 giaddr-field 130 intact.

One or more DHCP 66 servers for network host interfaces (e.g., IP 54 interfaces) available on the CMTS 12 receive the DHCPDISCOVER message and generate a DHCP 66 offer message ("DHCPOFFER") at Step 148. The DHCP 66 offer message is an offer of configuration parameters sent from network host interfaces to the DHCP 66 servers and back to a network host client (e.g., the CM 16) in response to a DHCPDISCOVER message. The DHCP 66 offer message is sent with the message fields set as illustrated in Table 7. However, other field settings can also be used. The DHCP 66 yiaddr-field 126 contains an IP 54 address for a network host interface available on the CMTS 12 and used for receiving data packets from data network 28.

TABLE 7

| DHCP 66 Parameter | Description |
|---|---|
| FLAGS 122 | BROADCAST bit set to zero. |
| YIADDR 126 | IP 54 address from a network host interface to allow the CM 16 to receive data from data network 28 via a network host interface available on the CMTS 12. |
| SIADDR 128 | An IP 54 address for a TFTP 64 server to download configuration information for an interface host. |
| CHADDR 132 | MAC 44 address of the CM 16. |
| SNAME 134 | Optional DHCP 66 server identifier with an interface host. |
| FILE 136 | A TFTP 64 configuration file name for the CM 16. |

DHCP 66 servers send the DHCPOFFER message to the address specified in the DHCP 66 giaddr-field 130 (i.e., the CMTS 12) from the DHCPDISCOVER message if associated network host interfaces (e.g., IP 54 interfaces) can offer the requested service (e.g., IP 54 service) to the CM 16. The DHCPDISCOVER message DHCP 66 giaddr-field 130 contains a downstream channel IP address 80 of the CMTS 12 that was received by the CM 16 in TSI message 76. This allows the CMTS 12 to receive the DHCPOFFER messages from the DHCP 66 servers and send them to the CM 16 via a downstream channel on cable network 14.

At Step 150 in FIG. 6B, the CMTS 12 receives one or more DHCPOFFER messages from one or more DHCP 66 servers associated with the network host interfaces (e.g., IP 54 interfaces). THE CMTS 12 examines the DHCP 66 yiaddr-field 126 and DHCP 66 chaddr-field 132 in the DHCPOFFER messages and sends the DHCPOFFER messages to the CM 16 via cable network 14 on a downstream cable channel. The DHCP 66 yiaddr-field 126 contains an IP 54 address for a network host IP 54 interface available on the CMTS 12 and used for receiving IP 54 data packets from data network 28. The DHCP 66 chaddr-field 132 contains the MAC 44 layer address for the CM 16 on a downstream cable channel from the CMTS 12 via cable network 14. The CMTS 12 "knows" the location of the CM 16 since it sent the CM 16 a MAC 44 layer address in one or more initialization messages (e.g., TSI message 76).

If a BROADCAST bit in flags-field 124 is set to one, the CMTS 12 sends the DHCPOFFER messages to a broadcast IP 54 address (e.g., 255.255.255.255) instead of the address specified in the DHCP 66 yiaddr-field 126. The DHCP 66 chaddr-field 132 is still used to determine that MAC 44 layer address. If the BROADCAST bit in the DHCP 66 flags-field 122 is set, the CMTS 12 does not update internal address or routing tables based upon the DHCP 66 yiaddr-field 126 and the DHCP 66 chaddr-field 132 pair when a broadcast message is sent.

At Step 152, the CM 16 receives one or more DHCPOFFER messages from the CMTS 12 via cable network 14 on a downstream connection. At Step 154, the CM 16 selects an offer for IP 54 service from one of the network host interfaces (e.g., an IP interfaces 54) associated with the CMTS 12 that responded to the DHCPDISCOVER message sent at Step 142 in FIG. 6A and establishes a virtual IP 54 connection. The selected DHCPOFFER message contains a network host interface address (e.g., IP 54 address) in the DHCP 66 yiaddr-field 126 (FIG. 5). A CM 16 acknowledges the selected network host interface with a DHCP 66 message sequence explained below.

After selecting and acknowledging a network host interface, the CM 16 has discovered an IP 54 interface address available on the CMTS 12 for completing a virtual IP 54 connection with the data network 28. Acknowledging a network host interface is explained below. The virtual IP 54 connection allows IP 54 data from the data network 28 to be sent to the CMTS 12 which forwards the IP 54 packets to the CM 16 on a downstream channel via the cable network 14. The CM 16 sends response IP 54 packets back to data network 28 via the PSTN 22 and the TRAC 24 if telephony return is used. The CM sends response IP packets back to the data network 28 via the CMTS 12 if a two-way cable network is used.

FIG. 7 is a block diagram illustrating an exemplary data-over-cable system 156 for the Method illustrated in FIGS. 6A and 6B. Data-over-cable system 156 includes DHCP 66 proxies ("P") 158, DHCP 66 servers ("S") 160 and associated Network Host Interfaces ("NHI") 162 (e.g., IP 54 interfaces), available on the CMTS 12. Multiple DHCP 66 proxies 158, DHCP 66 servers 160 and network host interfaces 162 are illustrated as single boxes in FIG. 7. FIG. 7 also illustrates the DHCP 66 proxies 158 separate from TRAC 24. In one embodiment of the present invention, the TRAC 24 includes integral DHCP 66 proxy functionality and no separate DHCP 66 proxies 158 are used. In such an embodiment, TRAC 24 forwards the DHCP 66 messages using the DHCP 66 giaddr-field 130 to the DHCP 66 servers 160 associated with the CMTS 12.

Figure 8:
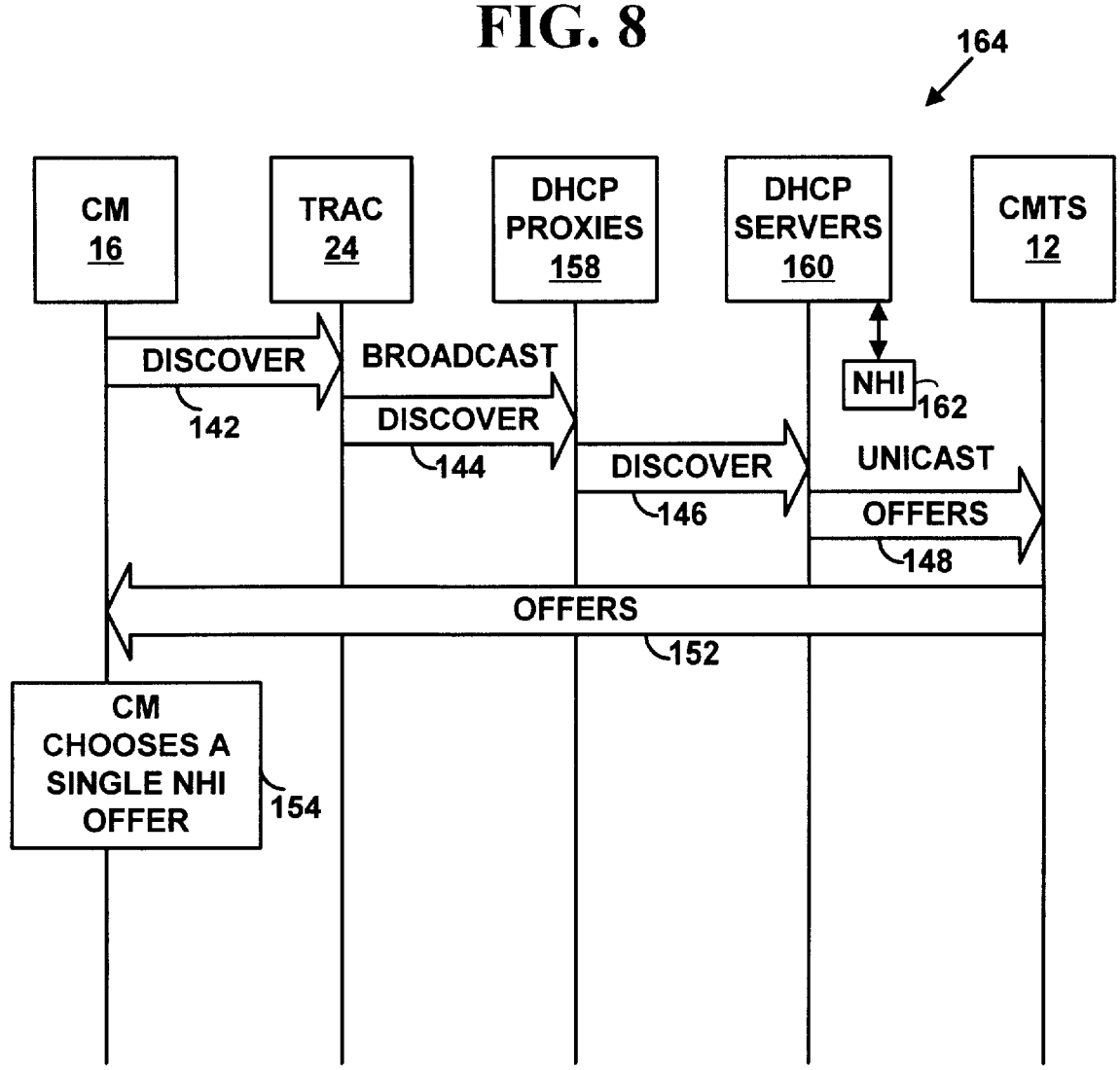
FIG. 8 is a block diagram illustrating the message flow of the method illustrated in FIGS. 6A and 6B.

FIG. 8 is a block diagram illustrating a message flow 162 of Method 140 (FIGS. 6A and 6B). Message flow 162 includes the DHCP proxies 158 and the DHCP servers 160 illustrated in FIGS. 6A and 6B. Steps 142, 144, 146, 148, 150 and 154 of Method 140 (FIGS. 6A and 6B) are illustrated in FIG. 8. In one embodiment of the present invention, the DHCP proxies 158 are not separate entities, but are included in TRAC 24. In such an embodiment, the DHCP proxy services are provided directly by TRAC 24.

Resolving Addresses for Network Host Interfaces

Since the CM 16 receives multiple the DHCPOFFER messages (Step 152 FIG. 6B) the CM 16 resolves and acknowledges one offer from a selected network host interface. FIGS. 9A and 9B are a flow diagram illustrating a Method 188 for resolving discovered host addresses in data-over-cable system 10 with telephony return.

At Step 190 in FIG. 9A, the CM 16 receives one or more DHCPOFFER messages from one or more of the DHCP 66 servers 160 associated with one or more network host interfaces 162 (e.g., IP 54 interfaces) associated with the CMTS 12. The one or more DHCPOFFER messages include the DHCP 66 fields set as illustrated in Table 7 above. However, other field settings could also be used. At Step 192, the CM 16 selects one of the DHCPOFFER messages. At Step 194, the CM 16 creates a DHCP 66 request message ("DHCPREQUEST") message to request the services offered by a network host interface 168 selected at Step 192. The fields of the DHCP request message are set as illustrated in Table 8. However, other field settings may also be used.

TABLE 8

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet). |
| HOPS 116 | Set to zero. |
| FLAGS 122 | Set BROADCAST bit to zero. |
| CIADDR 124 | If the CM 16 has previously been assigned an IP address, the IP address is placed in this field. If the CM 16 has previously been assigned an IP address by the DHCP 66, and also has been assigned an address via IPCP, the CM 16 places the DHCP 66 IP 54 address in this field. |
| YIADDR 126 | IP 54 address sent from the selected network host interface in DHCPOFFER message. |
| GIADDR 130 | CM 16 places the Downstream Channel IP 54 address 80 the CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network host interface. |

The DHCPREQUEST message is used to "request" services from the selected IP 54 host interface 162 associated with the CMTS 12 using a DHCP 66 server 160 associated with the selected network host interface 162. The DHCP 66 giaddr-field 130 (FIG. 5) includes the downstream channel IP address 80 for the CMTS 12 obtained in TSI message 76. Putting the downstream channel IP address 80 obtained in TSI message 76 in a DHCPREQUEST message allows the DHCPREQUEST message to be forwarded by the TRAC 24 to the DHCP 66 servers 160 associated with network host interfaces 162 associated with the CMTS 12. The DHCP 66 giaddr-field 126 contains an identifier and the DHCP 66 sname-field 134 contains a DHCP 66 server identifier 160 associated with the selected network host interface.

If the DHCP 66 giaddr-field 130 in a DHCP 66 message from a DHCP 66 client is non-zero, a DHCP 66 server 160 sends any return messages to a DHCP 66 server port on a DHCP 66 relaying agent (e.g., the CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124, or to the client's hardware address specified in the DHCP 66 chaddr-field 132 or to the local subnet broadcast address.

Returning to FIG. 9A at Step 196, the CM 16 sends the DHCPREQUEST message on the upstream telephony connection to TRAC 24 via the PSTN 22. At Step 198, a DHCP 66 layer on TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept DHCP 66 messages originally from the CM 16 destined for the DHCP 66 servers 160 associated with network host interfaces 168 associated with the CMTS 12. In another embodiment of the present invention, TRAC 24 provides the DHCP 66 proxy functionality, and no separate DHCP 66 proxies are used.

The one or more DHCP 66 proxies 158 on TRAC's 24 local network message forwards the DHCPOFFER to one or more of the DHCP 66 servers 160 associated with network host interfaces 162 (e.g., IP 54 interfaces) available on the CMTS 12 at Step 200 in FIG. 9B. Since DHCP 66 giaddr-field 130 in the DHCPDISCOVER message sent by the CM 16 is already non-zero (i.e., contains the downstream IP address of the CMTS 12), the DHCP 66 proxies leave 158 the DHCP 66 giaddr-field 130 intact.

One or more of the DHCP 66 servers 160 for the selected network host interface 162 (e.g., IP 54 interface) associated with the CMTS 12 receives the DHCPOFFER message at Step 202. A selected DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message as being for the selected DHCP 66 server 160.

The selected DHCP 66 server 160 associated with network host interface 162 selected by the CM 16 in the DHCPREQUEST message creates and sends a DHCP 66 acknowledgment message ("DHCPACK") to the CMTS 12 at Step 204. The DHCPACK message is sent with the message fields set as illustrated in Table 9. However, other field settings can also be used. The DHCP 66 yiaddr-field again contains the IP 54 address for the selected network host interface available on the CMTS 12 for receiving data packets from data network 28.

TABLE 9

| DHCP 66 Parameter | Description |
| --- | --- |
| FLAGS 122 | Set a BROADCAST bit to zero. |
| YIADDR 126 | IP 54 address for the selected network host interface to allow the CM 16 to receive data from data network 28. |
| SIADDR 128 | An IP 54 address for a TFTP 64 server to download configuration information for an interface host. |
| CHADDR 132 | MAC 44 address of the CM 16. |
| SNAME 134 | DHCP 66 server identifier associated with the selected network host interface. |

TABLE 9-continued

| DHCP 66 Parameter | Description |
| --- | --- |
| FILE 136 | A configuration file name for an network interface host. |

The selected DHCP 66 server 160 sends the DHCACK message to the address specified in the DHCP 66 giaddr-field 130 from the DHCPREQUEST message to the CM 16 to verify the selected network host interface (e.g., IP 54 interface) will offer the requested service (e.g., IP 54 service).

At Step 206, the CMTS 12 receives the DHCPACK message from the selected DHCP 66 server 160 associated with the selected network host interface 162 IP 54 address (e.g., IP 54 interface). The CMTS 12 examines the DHCP 66 yiaddr-field 126 and the DHCP 66 chaddr-field 132 in the DHCPACK message. The DHCP 66 yiaddr-field 126 contains an IP 54 address for a network host IP 54 interface available on the CMTS 12 and used for receiving IP 54 data packets from data network 28 for the CM 16. The DHCP 66 chaddr-field 132 contains the MAC 44 layer address for the CM 16 on a downstream cable channel from the CMTS 12 via cable network 14.

CMTS 12 updates an Address Resolution Protocol ("ARP") table and other routing tables on the CMTS 12 to reflect the addresses in the DHCP 66 yiaddr-field 126 and the DHCP 66 chaddr-field 132 at Step 208. As is known in the art, ARP allows a gateway such as the CMTS 12, to forward any datagrams from a data network such as data network 28 it receives for hosts such as the CM 16. For more information on ARP see RFC-826, incorporated herein by reference.

CMTS 12 stores a pair of network address values in the ARP table, the IP 54 address of the selected network host interface from the DHCP 66 yiaddr-field 126 and a Network Point of Attachment ("NPA") address. In one preferred embodiment of the present invention, The NPA address is a MAC 44 layer address for the CM 16 via a downstream cable channel. The IP/NPA address pair are stored in local routing tables with the IP/NPA addresses of hosts (e.g., the CMs 16) that are attached to cable network 14.

At Step 210, the CMTS 12 sends the DHCPACK message to the CM 16 via the cable network 14. At Step 212, the CM 16 receives the DHCPACK message, and along with the CMTS 12 has addresses for a "virtual connection" between the data network 28 and the CM 16. When data packets arrive on the IP 54 address for the selected CM 16 they are sent to the CMTS 12 and the CMTS 12 forwards them using a NPA (i.e., a MAC 44 address) from the routing tables on a downstream channel via the cable network 14 to the CM 16.

If a BROADCAST bit in the DHCP 66 flags-field 124 is set to one in the DHCPACK, the CMTS 12 sends the DHCPACK messages to a broadcast IP 54 address (e.g., 255.255.255.255). The DHCP 66 chaddr-field 132 is still used to determine a MAC 44 layer address. If the BROADCAST bit in the DHCP 66 flags field 122 is set, the CMTS 12 does not update the ARP table or other routing tables based upon the DHCP 66 yiaddr-field 126 and the DHCP 66 chaddr-field 132 pair when a broadcast message is sent.

FIG. 10 is a block diagram illustrating the message flow 214 of the Method 188 illustrated in FIGS. 9A and 9B. Message flow 214 includes the DHCP proxies 158 and the DHCP servers 160 illustrated in FIG. 7. Method Steps 194, 196, 198, 204, 208, 210 and 212 of Method 188 (FIGS. 9A and 9B) are illustrated in FIG. 10. In one embodiment of the present invention, the DHCP proxies 158 are not separate entities, but are included in TRAC 24. In such an embodiment, the DHCP proxy services are provided directly by TRAC 24.

After Method 188, the CMTS 12 has a valid IP/MAC address pair in one or more address routing tables including an ARP table to forward IP 54 data packets from data network 28 to the CM 16, thereby creating a virtual IP 54 data path to from the CM 16 as was illustrated in and Table 3. The CM 16 has necessary parameters to proceed to the next phase of initialization, a downloading of a configuration file via TFTP 64. Once the CM 16 has received the configuration file and has been initialized, it registers with the CMTS 12 with a registration message and is ready to receive data from data network 14.

In the event that the CM 16 is not compatible with the configuration of the network host interface 162 received in the DHCPACK message, the CM 16 may generate a DHCP 66 decline message ("DHCPDECLINE") and transmit it to TRAC 24 via the PSTN 22. A DHCP 66 layer in TRAC 24 forwards the DHCPDECLINE message to the DHCP servers 160 and the CMTS 12. Upon seeing a DHCPDECLFNE message, the CMTS 12 flushes its ARP tables and routing tables to remove the now invalid IP/MAC pairing. The CM 16 may also send the DHCPDECLINE message to the CMTS 12 on an upstream cable connection. The CMTS 12 will then forward the DHCPDECLINE message to the appropriate DHCP 66 server 160. If an IP 54 address for a network host interface is returned in a DHCPACK that is different from the IP 54 address sent by the CM 16 in the DCHCPREQUEST message, the CM 16 uses the IP 54 address it receives in the DHCPACK message as the IP 54 address of the selected network host interface for receiving data from data network 28.

One preferred embodiment of the present invention is described with respect to, but is not limited to a data-over-cable-system with telephony return. Method 142 and Method 188 can also be used with a cable modem that has a two-way connection (i.e., upstream and downstream) to the cable network 14 and the CMTS 12. In a data-over-cable-system without telephony return, the CM 16 would broadcast the DHCPREQUEST message to one or more DHCP 66 servers 160 associated with one or more network host interfaces 162 associated with the CMTS 12 using an upstream cable connection on the data network 14 including the IP 54 address of the CMTS 12 in the DHCP 66 giaddr-field 130. In such an embodiment, the upstream telephony connection, the PSTN 22, the TRAC 24 and the DHCP 66 proxies 158, are not used. If an upstream cable connection is used instead of an upstream telephony return channel, method steps in Methods 142 and 188 associated with the PSTN 22, the TRAC 24 and the DHCP proxies are skipped. Method 188 accomplishes resolving addresses for network interface hosts from a cable modem in a data-over-cable with or without telephony return, and without extensions to the existing DHCP protocol.

CPE Initialization in a Data-over-cable System

The CPE 18 also uses the DHCP 66 to generate requests to obtain IP 54 addresses to allow CPE 18 to also receive data from data network 28 via the CM 16. In a preferred embodiment of the present invention, the CM 16 functions as a standard BOOTP relay agent/DHCP Proxy 158 to facilitate CPE's 18 access to the DHCP 66 server 160

Figure 11A:
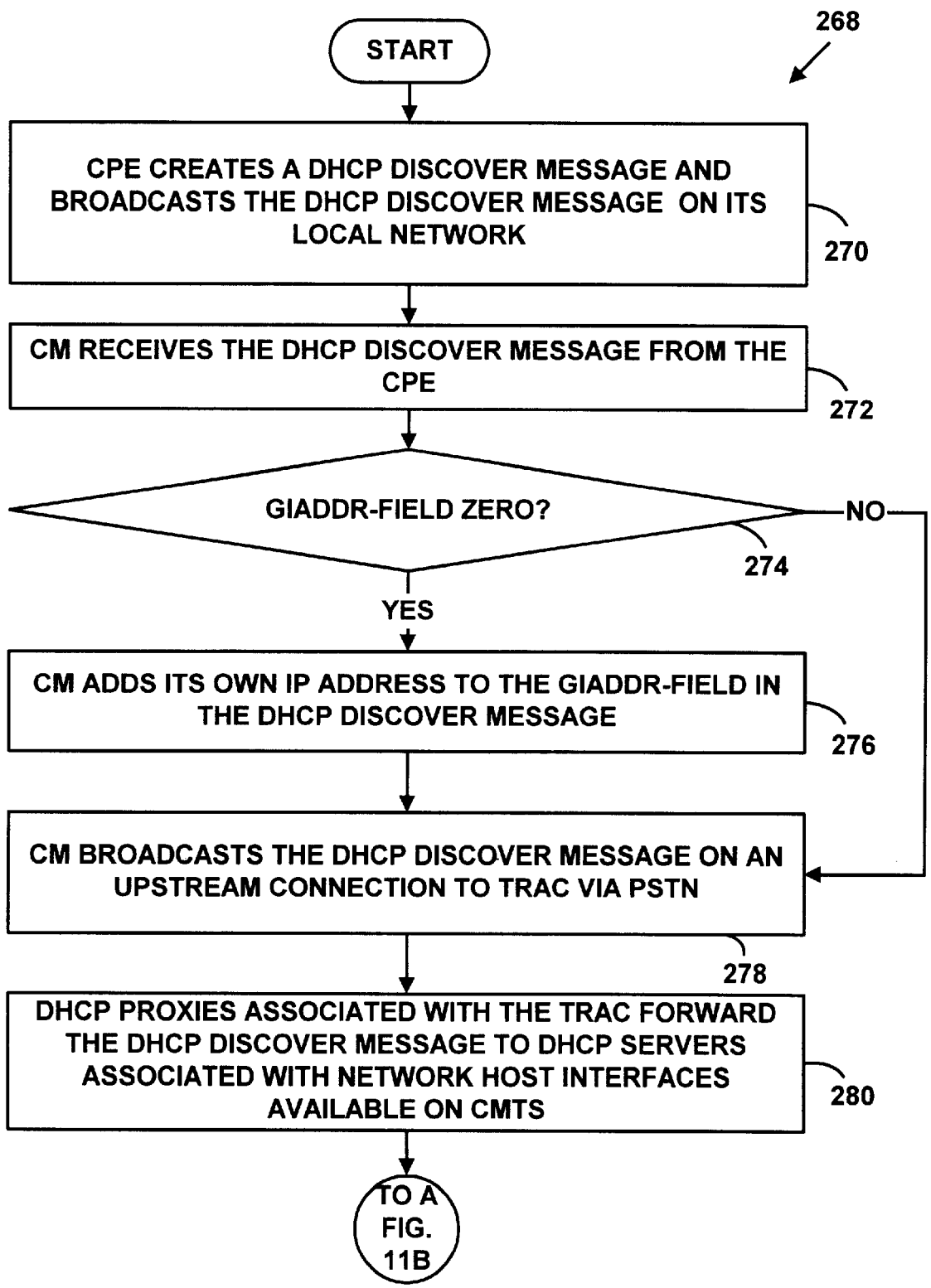

FIGS. 11A and 11B are a flow diagram illustrating a Method 268 for addressing network host interfaces 162 from CPE 18. At Step 270 in FIG. 11A, the CPE 18 generates a DHCPDISCOVER message broadcasts the DHCPDISCOVER message on its local network with the fields set as illustrated in Table 6 above with addresses for CPE 18 instead of the CM 16. However, more or fewer fields could also be set in the DHCPDISCOVER message. The CM 16 receives the DHCPDISCOVER as a standard BOOTP relay agent at Step 272. The DHCPDISCOVER message has a MAC 44 layer address for the CPE 18 in the DHCP 66 chaddr-field 132, which the CM 16 stores in one or more routing tables (e.g., ARP tables). As a BOOTP relay agent, the CM 16 checks the DHCP 66 giaddr-field 130 (FIG. 5) at Step 274. If the DHCP 66 giaddr-field 130 is set to zero, the CM 16 put its own IP 54 address into the DHCP 66 giaddr-field 130 at Step 276, including the CM 16 is a relay agent.

If the DHCP 66 giaddr-field 130 is non-zero, the CM 16 does not alter the DHCP 66 giaddr-field 130 since there could be another BOOTP relay agent attached to CPE 18 which may have already set the DHCP 66 giaddr-field 130. A BOOTP relay agent attached to CPE 18 would have also have acquired its IP 54 address using a DHCP 66 discovery process similar to the one described above (e.g., FIG. 10).

Returning to FIG. 11A, at Step 278, the CM 16 broadcasts the DHCPDISCOVER message to a broadcast address via the PSTN 22 to the TRAC 24. In one embodiment of the present invention, the broadcast address is an IP 54 broadcast address (e.g., 255.255.255.255). At Step 280, one or more DHCP 66 proxies 158 associated with TRAC 24, recognize the DHCPDISOVER message, and forward it to one or more DHCP 66 servers 160 associated with one or more network host interfaces 162 associated with the CMTS 12. Since the DHCP 66 giaddr-field 130 is already non-zero, the DHCP proxies 160 leave the DHCP 66 giaddr-field 130 intact. In another embodiment of the present invention, TRAC 24 includes DHCP 66 proxy 158 functionality and no separate DHCP 66 proxies 158 are used. In yet another embodiment of the present invention, the CM 16 broadcasts the DHCPDISCOVER message to the CMTS 12 on an upstream cable connection. The CMTS 12 forwards the DHCPDISCOVER message to one or more DHCP servers 160.

At Step 282 in FIG. 11B, the one or more DHCP servers 160 receive the DHCPDISCOVER message from one or more DHCP proxies 158 and generate one or more DHCPOFFER messages to offer connection services for one or more network host interfaces 162 associated with the CMTS 12 with fields set as illustrated in Table 7. The one or more DHCP 66 servers 160 send the one or more DHCPOFFER messages to the address specified in the DHCP 66 giaddr-field 130 (e.g., the CM 16 or a BOOTP relay agent associated with CPE 18), which is an IP 54 address already contained in an ARP or other routing table in the CMTS 12. Since the CMTS 12 also functions as a relay agent for the one or more DHCP servers 160, the one or more DHCPOFFER messages are received on the CMTS 12 at Step 284.

The CMTS 12 examines the DHCP 66 yiaddr-field 126 and the DHCP 66 giaddr-field 130 in the DHCPOFFER messages, and sends the DHCPOFFER messages down cable network 14 to IP 54 address specified in the DHCP 66 giaddr-field 130. The MAC 44 address for the CM 16 is obtained through a look-up of the hardware address associated with the DHCP 66 chaddr-field 130 (e.g., using ARP). If the BROADCAST bit in the DHCP 66 flags-field 122 is set to one, the CMTS 12 sends the DHCPOFFER message to a broadcast IP 54 address (e.g., 255.255.255.255), instead of the address specified in the DHCP 66 yiaddr-field 126. The CMTS 12 does not update its ARP or other routing tables based upon the broadcast DHCP 66 yiaddr-field 126 DHCP 66 chaddr-field 132 address pair.

Returning to FIG. 11 B, the CM 16 receives the one or more DHCPOFFER messages and forwards them to CPE 18 at Step 286. The CM 16 uses the MAC 44 address specified by the DHCP 66 chaddr-field 132 look-up in its routing tables (e.g., an ARP table) to find the address of CPE 18 even if the BROADCAST bit in the DHCP 66 flags-field 122 is set. At Step 290, the CPE 18 receives the one or more DHCPOFFER messages from the CM 16. At Step 292, CPE the 18 selects one of the DHCPOFFER messages to allow a virtual connection to be established between the data network 28 and the CPE 18. Method 266 accomplishes addressing network interface hosts from CPE 18 in data-over-cable system 10 without extensions to the existing DHCP 66 protocol.

Figure 12B:
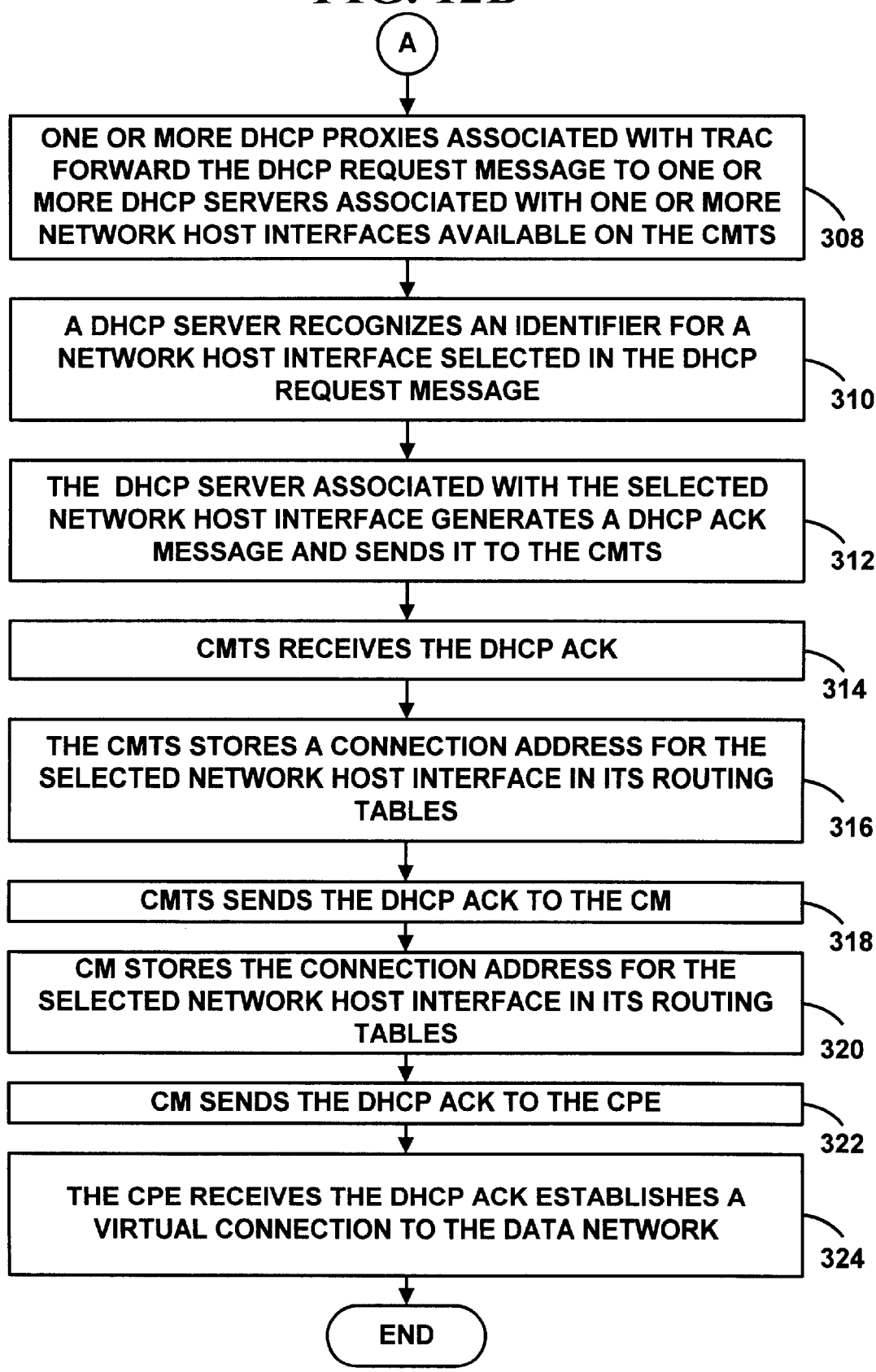

FIGS. 12A and 12B are a flow diagram illustrating a Method 294 for resolving network host interfaces from the CPE 18. At Step 296 of FIG. 12A, the CPE 18 receives the one or more DHCPOFFER messages from the one or more DHCP 66 servers 160 associated with the one or more network host interfaces associated with the CMTS 12. At Step 298, the CPE 18 chooses one offer of services from a selected network host interface 162. At Step 300, the CPE 18 generates a DHCPREQUEST message with fields set as illustrated in Table 8 above with addresses for CPE 18 instead of the CM 16. However, more or fewer fields could also be set. At Step 302, CPE 18 sends the DHCPREQUEST message to the CM 16. At Step 304, the CM 16 forwards the message to TRAC 24 via the PSTN 22 (or to the CMTS 12 via an upstream cable connection if a two-way cable system is being used).

At Step 306, a DHCP proxies 158 associated with the TRAC 24 broadcasts the DHCPREQUEST message on its local network leaving the DHCP 66 giaddr-field 130 intact since it already contains a non-zero value. The TRAC's 24 local network-includes connections to one or more DHCP 66 proxies 158. The DHCP 66 proxies 158 accept the DHCP 66 messages originally from the CPE 18 destined for the DHCP 66 servers 160 associated with network host interfaces 162 associated with the CMTS 12. In another embodiment of the present invention, TRAC 24 provides the DHCP 66 proxy functionality, and no separate DHCP 66 proxies 158 are used.

One or more DHCP 66 proxies 158 on TRAC's 24 local network recognize the DHCPOFFER message and forward it to one or more of the DHCP 66 servers 160 associated with network host interfaces 162 (e.g., IP 54 interfaces) associated with the on the CMTS 12 at Step 308 in FIG. 12B. Since the DHCP 66 giaddr-field 130 in the DHCPDISCOVER message sent by the CPE 18 is already non-zero, (i.e., set by the CM 16) the DHCP 66 proxies leave the DHCP 66 giaddr-field 130 intact.

One or more DHCP 66 servers 160 for the selected network host interfaces 162 (e.g., IP 54 interface) associated with the CMTS 12 receive the DHCPOFFER message at Step 310. A selected the DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message for the selected the DHCP 66 server 160.

The selected DHCP 66 server 160 associated with network host interface 162 selected by the CPE 18 in the DHCPREQUEST message creates and sends a DHCP 66 acknowledgment message ("DHCPACK") to the CMTS 12 at Step 312 using the DHCP 66 giaddr-field 130. The DHCPACK message is sent with the message fields set as illustrated in Table 9. However, other field settings can also be used. The DHCP 66 yiaddr-field contains the IP 54 address for the selected network host interface 162 available on the CMTS 12 for receiving data packets from data network 28 for CPE 18.

At Step 314, the CMTS 12 receives the DHCPACK message. the CMTS 12 examines the DHCP 66 giaddr-field 130 and looks up that IP 54 address in its ARP table or other routing tables for an associated MAC 44 address. This is a MAC 44 address for the CM 16, which sent the DHCPREQUEST message from CPE 18. The CMTS 12 uses the MAC 44 address associated with the DHCP 66 giaddr-field 130 and the DHCP 66 yiaddr-field 126 to update its routing and ARP tables reflecting this address pairing at Step 316. At Step 318, the CMTS 12 sends the DHCPACK message on a downstream channel on cable network 14 to the IP 54 and MAC 44 addresses, respectively (i.e., to the CM 16). If the BROADCAST bit in the DHCP 66 flags-field 122 is set to one, the CMTS 12 sends the DHCPACK message to a broadcast IP 54 address (e.g., 255.255.255.255), instead of the address specified in the DHCP 66 yiaddr-field 126. the CMTS 12 uses the MAC 44 address associated with the DHCP 66 chaddr-field 130 even if the BROADCAST bit is set.

The CM 16 receives the DHCPACK message. The CM 16 examines the DHCP 66 yiaddr-field 126 and DHCP 66 chaddr-field 132, and updates its routing table and ARP tables to reflect the address pairing at Step 320. At Step 322, the CM 16 sends the DHCPACK message to CPE 18 via the CMCI 20 at the IP 54 and the MAC 44 addresses respectively from its routing tables. If the BROADCAST bit in the DHCP 66 flags-field 122 is set to one, the CM 16 sends the downstream packet to a broadcast IP 54 address (e.g., 255.255.255.255), instead of the address specified in the DHCP 66 yiaddr-field 126. The CM 16 uses the MAC 44 address specified in the DHCP 66 chaddr-field 132 even if the BROADCAST bit is set to locate the CPE 18. At Step 324, CPE 18 receives the DHCPACK from the CM 16 and has established a virtual connection to data network 28.

In the event that the CPE 18 is not compatible with the configuration received in the DHCPACK message, the CPE 18 may also generate a DHCP 66 decline ("DHCPDECLINE") message and send it to the CM 16. The CM 16 will transmit the DHCPDECLINE message up the PPP 50 link via the PSTN 22 to TRAC 24 or the CMTS 12 via an upstream cable connection. On seeing a DHCPDECLINE message the TRAC 24 sends a unicast copy of the message to the CMTS 12. the CM 16 and the CMTS 12 examine the DHCP 66 yiaddr-field 126 and the DHCP 66 giaddr-field 130, and update their routing and ARP tables had routing tables to flush any invalid pairings.

Upon completion of Methods 266 and 292, the CM 16 and the CMTS 12 have valid IP/MAC address pairings in their routing and ARP tables. These tables store the same set of IP 54 addresses, but does not associate them with the same MAC 44 addresses. This is because the CMTS 12 resolves all the CPE 18 IP 54 addresses to a MAC 44 address of a corresponding the CM 16. The CMs 16, on other hand, is able to address the respective MAC 44 addresses of their own multiple CPE 18. This also allows the DHCP 66 clients associated with the CPE 18 to function normally since the addressing that is done in the CM 16 and the CMTS 12 is transparent to CPE 18 hosts.

FIG. 13 is a block diagram illustrating a message flow 326 for Methods 268 and 294 in FIGS. 11A, 11B, and 12A and 12B. Message flow 326 illustrates a message flow for Methods 268 and 294, for a data-over-cable system with and without telephony return. In another embodiment of the present invention, the CM 16 forwards requests from CPE 18 via an upstream cable connection on cable network 14 to the DHCP servers 160 associated with one or more network host interfaces 162 associated with the CMTS 12. In such an embodiment, upstream telephony return channel, the PSTN 22, the TRAC 24 and the DHCP proxies 158 are not used.

Method 268 and 294 accomplishes resolving addresses for network interface hosts from customer premise equipment in a data-over-cable with or without telephony return without extensions to the existing DHCP protocol. Methods 268 and 294 of the present invention are illustrated in data-over-cable system 10 with telephony return. However, the present invention is not limited to data-over-cable system 10 with telephony return and can be used in data-over-cable system 10 without telephony return by using an upstream cable connection instead of an upstream telephony connection and skipping method steps from Methods 268 and 294 associated with the PSTN 22, the TAC 24 and the DHCP 66 proxies 158.

Completing Initialization of a Cable Modem or CPE

After obtaining an IP 54 address via DHCP 66, the CM 16 receives a configuration file from a configuration file server. Information about the configuration file is included in the DHCPACK message (e.g., Table 9). For example, in one preferred embodiment of the present invention, a network address (e.g., an IP 54 address) for the server is included in a DHCP 66 siaddr-field 128 (FIG. 5), and a name of the configuration file in a DHCP 66 file-field 136. The configuration file includes multiple configuration parameters used to initialize the CM 16. The TFTP 64 server obtains the requested configuration file and sends it to the CM 16. In one embodiment of the present invention, the configuration file is obtained by the TFTP 64 server from the DHCP server 160. In another embodiment of the present invention, the configuration file is obtained by the TFTP 64 server from the CMTS 12.

Configuration information from an exemplary configuration file is illustrated in Type/Length/Value ("TLV") format in Table 10. However, more or fewer configuration parameters could also be used. In addition, only an exemplary description of the Value in the TLV format is included since the actual numbers used for the Value fields are implementation specific.

TABLE 10

| Type | Length | Value | Notes |
| --- | --- | --- | --- |
| 4x | 6 | Variable | Header Length |
| 41 | 1 | 1 | Class-Of-Service-1 |
| 42 | 4 | 1,500,000 | Maximum downstream data rate of 1.5 Mbps |
| 43 | 4 | 256,000 | Maximum upstream data rate of 256 Kbps |
| 44 | 1 | 5 | Priority is level 5. |
| 45 | 4 | 8,000 | Minimum upstream data rate of 8 Kbps |
| 47 | 1 | 1 | Privacy enabled |
| 171 | 4 | 1 | Authorize timeouts |
| 3 | 1 | 1 | Enable network access |
| 8x | 8 | Variable | Vendor ID |
| 83 | N | Variable | N-bytes of vendor specific data in TLV format |

TABLE 10-continued

| Type | Length | Value | Notes |
| --- | --- | --- | --- |
| 0 | N | N-byte padding | Padding to make message 4-byte aligned |
| 255 | N/A | | End-of-file |

The CPE 18 may also receive a configuration file, if necessary from the CM 16, the CMTS 12, or the DHCP server 160 via the TFTP 64 server. The CPE 18 also receives infomation on where to find a configuration file, if necessary, in a DCHPACK message. However, the CPE 18 may also receive information on where to find a configuration file with other messages (e.g., MAC 44) from the CM 16 or the CMTS 12.

After receiving a configuration file, the CM 16 sends a registration message to the CMTS 12. The registration message is typically a MAC 44 management message that includes a MAC 44 management header and selected information from the configuration file (e.g., from Table 10) in TLV format. The registration message is sent within a pre-determined time after receiving a DHCPACK to provide a security measure to protect the data-over-cable system 10. If the registration message is not sent to the CMTS 12 within the pre-determined time, the CMTS 12 purges its ARP and routing tables of entries including the IP 54 address obtained by the CM 16 with DHCP 66. This helps prevent a rogue CM 16 from registering with the CMTS 12.

If a data-over-cable system with telephony return is being used, the registration message is sent on an upstream telephony connection with PPP 50 via the PSTN 22 and TRAC 24 to the CMTS 12. If a data-over-cable system without telephony return is being used, the registration message is sent on an upstream cable connection to the CMTS 12.

Upon receiving the registration message from the CM 16, the CMTS 12 updates its routing and ARP tables to reflect a CM 16 IP 54/MAC 44 address pairing in the registration message. The CMTS 12 will generate an SNMP 62 trap if an IP 54 address in the registration message is paired with a different MAC 44 address for the CM 16 in the CMTS 12 tables. As is known in the art, an SNMP 62 trap is used to indicate an error condition in a network. As was discussed above, the CMTS 12 records an IP 54 address obtained by the CM 16 with DHCP 66 before it forwards the DHCPACK to the CM 16.

The CMTS 12 sends a registration response back to the CM 16 that also includes CPE 18 IP 54 addresses in the CMTS 12 routing and ARP tables which are associated with a MAC 44 address for the CM 16, if any. However, the CPE 18 may not have obtained an IP 54 address with DHCP 66 yet. The registration response message is also typically a MAC 44 management message with MAC 44 management header and TLV encoded data for the CM 16 (e.g., CMTS 12 data or vendor specific data).

The CM 16 may also proxy ARP for any CPE 18 IP 54 addresses in a registration response message. The CM 16 will use ARP on the CMCI 20 (FIG. 1) for the hardware addresses of the CPE 18 IP 54 addresses and update routing and ARP tables on the CM 16.

The CPE 18 may also send a registration message to the CMTS 12 via the CM 16, and may also receive a registration response from the CMTS 12 via the CM 16. If the CPE 18 sends a registration message, both the CM 16 and the CMTS 12 update ARP and other routing tables. The CMTS 12 will update its routing and ARP tables to reflect a CPE 18 IP 54 addresses and the CM 16 MAC 44 address pairing in the registration request. As was discussed above, the CMTS 12 records an IP 54 address obtained by the CPE 18 with DHCP 66 before sending a DHCPACK for the CPE 18 to the relay agent, the CM 16. The CMTS 12 will also generate an SNMP 64 trap if a CPE 18 IP 54 address in the registration request is paired with a different MAC 44 address for the CM 16 in the CMTS 12 tables.

If a data-over-cable system without telephony return is being used, the CM 16 sends messages to the CMTS 12 on an upstream cable connection and receives messages from the CMTS 12 on a downstream cable channel. The CM 16 can also send data packets on an upstream cable connection to the CMTS 12, which forwards the data packets to the data network 28 via the CMTS-NSI 32. The CMTS 12 sends response data packets back to the CM 16 on a downstream cable channel.

If a data-over-cable system with telephony return is used, the CM 16 can send messages to the CMTS 12 on an upstream telephony connection via the PSTN 22 to the TRAC 24, which forwards the messages to the CMTS 12. The CM 16 can also send data packets on an upstream telephony connection via the PSTN 22 to the TRAC 24, which forwards the data packets to the data network 28. The CMTS 12 sends response data packets back to the CM 16 on a downstream cable channel.

After completing the registration request and registration response sequence, the CM 16 and/or the CPE 18 have completed initialization and can communicate with the data-over-cable system 10 and the data network 28 (FIG. 1). The CM 16 typically acts as a relay agent for requests and responses for one or more CPE 18 attached to the CM 16.

Automatic Termination of Telephone Dial-up Connection

In accordance with the present invention, FIG. 1 is a block diagram of data-over-cable system 10. In the case of data-over-cable system 10 with telephony return, the CM 16 is initialized as described in more detail above. When the CM 16 is initially powered on, the CM 16 will receive a TCD message 70 (see FIG. 3) from the CMTS 12 that is used to provide dialing and access instructions on downstream channels via cable network 14. Information in the TCD message 70 is used by the CM 16 to connect to the TRAC 24. There is at least one SPD 74 (see Table 1) contained within TCD message 70. As described above, SPDs 74 are compound TLV encodings that define telephony physical-layer characteristics that are used by the CM 16 to initiate a telephone call. The SPD 74 is a TLV-encoded data structure that contains sets of dialing and access parameters for the CM 16 with telephony return. The SPD 74 contains the parameters shown in Table 1 and may contain optional vendor specific parameters.

A TSI message 76 (see Table 2) is transmitted by the CMTS 12 at periodic intervals (e.g., every 2 seconds) to report CMTS 12 information to the CM 16 whether or not telephony return is used. Information in the TSI message 76 is used by the CM 16 to obtain information about the status of the CMTS 12. If telephony return is being used, after receiving the TCD message 70 and the TSI message 76, the CM continues to establish access to data network 28 (and resources on the network) by first dialing into the TRAC 24 and establishing a telephony PPP 50 session.

Both the CMTS 12 and the CM 16 have one or more routing tables (e.g., ARP tables) used for storing and updating addressing information. Once a virtual connection is established between the CPE 18 and the data network 28, as described above, both the CMTS 12 and the CM 16 store "valid" pairs of addresses (IP 54 and MAC 44 level hardware) in order to enable downstream communication from the CMTS 12 to the CM 16 and CPE 18 via the cable network 14. The CM 16 and the CMTS 12 have valid IP/MAC address pairings in their routing or ARP tables. These CM 16 and CMTS 12 tables store identical sets of IP 54 addresses, but the sets are not associated with the same MAC 44 addresses. This is because the CMTS 12 resolves all of the CPE 18 IP 54 addresses to a MAC 44 address of a corresponding CM 16. The CM 16, on other hand, is able to address the respective MAC 44 addresses of its own multiple CPE 18. This also allows the DHCP 66 clients associated with the CPE 18 to function normally since the addressing that is done in the CM 16 and the CMTS 12 is transparent to the CPE 18 hosts. Naturally, the CM 16 routing or ARP table stores the CMTS 12 and the network host interface 162 (FIG. 7) addresses as well so that the CM 16 can connect upstream via the PSTN 22.

In the exemplary embodiment, the CMTS 12 initially provides CM 16 with information via the SPD 74 contained within the TCD message 70 regarding dialing and access that allows the CM 16 to initiate a PPP 50 telephone dial-up connection and connect to the TRAC 24 via the PSTN 22.

The CM 16 is capable of terminating a pre-existing telephone dial-up connection. As shown in Table 1, one parameter of the SPD 74 sent by the CMTS 12 to the CM 16 as part of a TCD message 70 is the Demand Dial Timer ("DDT"). This parameter indicates the time (in seconds) of inactive networking time that will be allowed to elapse before hanging up a telephone connection at the CM 16. If this optional parameter is not present in the SPD 74, or is set to zero, then the "demand dial" feature is not activated on the CM 16. The default value of the DDT is zero, therefore in a default situation, the "demand dial" feature is not activated. As such, the demand dial or inactivity timer feature can be enabled or not enabled by the CMTS 12. Of course, the value of the DDT or inactivity timer can be said to be determined or set by the cable television network headend 26 or more specifically the CMTS 12.

As described above, the CM 16 typically transmits data packets upstream to the TRAC 24 via the PSTN 22 on the telephone dial-up connection. When the CM 16 acts as a relay agent for the CPE 18 or multiple CPE 18, the CM 16 similarly forwards packet data along the upstream telephone line connection.

The CM 16 negotiates and maintains the PPP 50 telephone dial-up upstream connection as described in more detail above. Typically, the telephony interface 48 or other telephone line connection interface is monitored for outgoing data packets or activity. Also typically, the CM 16 or a task associated with the CM 16 will monitor or flag any outgoing data packets on the PPP 50 connection. The DDT or inactivity timeout value is used as a limit to a timing mechanism or task, which may be located on the CM 16. If the DDT or other inactivity timer is enabled or activated, and if no outgoing or upstream data packets are monitored within the inactivity timeout period, (i.e. the DDT), then the CM 16 terminates or drops the PPP 50 upstream telephone connection. If an outgoing data packet or data activity of any kind is monitored at the telephone connection interface, the inactivity timer is reset, and begins to run again.

A problem with using data-over-cable system 10 with telephony return is coordinating the dropping of the telephone dial-up connection via PSTN 22 to TRAC 24 when the connection to a data network 28 such as the Internet is no longer being used. The current approach, i.e. monitoring the PPP 50 connection or telephony interface 48 for outgoing or upstream data activity, has two drawbacks that effectively impair the ability of the CM 16 to terminate a telephone line that is no longer in use by the CM 16 or by connected CPE 18. First, any data packet, not just those transmitted by connected CPE 18, will reset the timer. For example, the IP 54 addresses assigned to the CM 16 are leased and are not permanent. The CM 16 must renew its IP 54 address leases and does so periodically. Data packets sent by the CM 16 for transmission over the telephone line will be flagged or monitored at the telephony interface 48 and will reset the inactivity timer. The CM 16 must also synchronize its internal timer with the rest of the network. Synchronization data packets transmitted over the telephone line will reset the inactivity timer as well. For more information on IP 54 address leasing, the dynamic allocation of network addresses, and DHCP 66 see Internet Engineering Task Force ("IETF") Request for Comments ("RFC"), RFC-2131, incorporated herein by reference. Information for IETF RFCs can be found on the World Wide Web at URLs "ds.internic.net"or "www.ietf.org."

Second, the duration of the inactivity timeout is significant, and, in cases where the timeout feature is not enabled, the duration is theoretically infinite. Apart from whether or not data packets other than those originating from devices such as the CPE 18 connected to the CM 16 are monitored at the PPP 50 connection or telephony interface, the timeout period is quite long. This means that even if no outgoing data packets of any kind are monitored, the CM 16 must wait a significant and possibly excessive amount of time before terminating the telephone line.

As is known to those in the art, a typical time for the DDT is six to twenty minutes or even longer, however, making it impossible for the CM 16 to readily discern that a particular CPE 18 has stopped transmitting and is no longer using its telephone line connection. From the perspective of an individual user, this pre-set time presents a problem, as an individual CM 16 will not immediately drop the telephone line connection even when the user turns his or her computer off. Eventually, if no outgoing data packets are flagged on the PPP 50 line, the CM 16 will terminate the telephone dial-up connection. Waiting for the DDT or inactivity timeout to expire so that the CM 16 can terminate unused telephone connections, leaves an individual user with an open telephone line connection until the timeout occurs.

There are instances where both considerations come into play. As an example, consider a DDT or an inactivity timeout of a lengthy, but feasible, duration, such as thirty minutes as set by the CMTS 12 in the SPD 74 sent to the CM 16 as part of TCD message 70. If the CM 16 renews its IP 54 address leases every fifteen minutes, for example, the CM 16 will flag or monitor the outgoing data packet at the PPP 50 interface. In that event, the CM 16 will never, at least theoretically, terminate the telephone line even if all CPE 18 are turned off.

In accordance with the preferred embodiments of the present invention, some of the problems associated with using a telephone dial-up or uplink connection to a data network, such as with a CM 16 using a telephone return line, are addressed.

In accordance with an exemplary embodiment of the present invention, the CM 16 of data-over-cable system 10 with telephony return monitors the NI 17 for incoming data transmission activity from connected CPE 18. If the CM 16 determines or detects no incoming data transmission activity, the CM 16 begins to query, poll, test the reachability of, or attempt to determine the status of the connected CPE 18. In accordance with the present invention, a query is a status request or an attempt to determine the status of one or more devices such as the CPE 18. Generally, the CM 16 will have one or more CPE 18 connected via the NI 17. The CM 16 queries, polls, or tests the CPE 18 in order to detect an indication of data activity, or transmit status, or usage, or reachability, as applicable. If no activity from the CPE 18 is detected or sensed for a predetermined time period, which preferably includes separate intervals of time at which querying is repeated, the CM 16 terminates the PPP 50 telephone dial-up connection to the TRAC 24 via the PSTN 22.

FIGS. 14A and 14B are a flow diagram illustrating a Method 400 for automatically terminating a telephone dial-up connection to a data network 28, from a CM 16 or other network device having a network interface such as NI 17 to one or more connected devices such as CPE 18. In an exemplary preferred embodiment described below, the CM 16 of FIG. 1 includes functionality and capability to carry out the steps in Method 400. The steps of Method 400, however, need not be performed by the CM 16. The CM 16 can include functionality and capability to include all, some, or none of the steps of Method 400, in any order required to accomplish the task at hand. In a preferred embodiment, the CM 16 has a NI 17 to one or more connected CPE 18, and utilizes a telephone line dial-up connection via PSTN 22 to data network 28.

At Step 402, the CM 16 monitors the NI 17 for incoming data transmission activity from the one or more CPE 18. Preferably, at Step 404, the CM 16 determines an absence of incoming data transmission activity. Preferably, at Step 406, the CM 16 activates a querying step (Step 408). At step 408, the CM 16 queries the status of the one or more CPE 18. At Step 410, the CM 16 receives any responses from the one or more CPE 18 to the status query at Step 408. Preferably, at Step 412, the CM 16 continues to query the status of the one or more CPE 18 (as at Step 408). At Step 414, the CM 16 terminates the telephone dial-up connection if no response is received by the CM 16 at Step 410.

At Step 402, the CM 16 monitors the NI 17 for incoming data transmission activity from the one or more CPE 18. Preferably, the CM 16 monitors the NI 17 for incoming activity on a continuous basis. However, in other embodiments the CM 16 need not continue to monitor the NI 17 if monitoring the NI 17 is considered superfluous to carrying out other steps of the Method 400.

Preferably, at Step 404, the CM 16 determines an absence of incoming data transmission activity from the one or more CPE 18. This is at least a preliminary indication that the one or more CPE 18 may be inactive. Preferably, the CM 16 determines the absence of incoming data transmission activity if the absence of activity persists for longer than a time tdetennine. This time $t_{determine}$ is under one minute, for example, fifteen seconds, in a preferred embodiment. However, this time is not limited to under one minute in all embodiments of the invention, and can, in the case of the data-over-cable system 10 of FIG. 1, vary in accordance with consideration of, or relative to, the value of the inactivity timeout/Demand Dial Timer. In still other preferred embodiments, this time is set according to or relative to the "boot" or "reboot" time of a personal computer included in the one or more CPE 18.

Preferably, at Step 406, the CM 16 activates a querying step (Step 408). Preferably, the CM 16 activates Step 408 if the CM 16 determines an absence of incoming data transmission activity from the one or more CPE 18 at Step 404.

At step 408, the CM 16 queries the status of the one or more CPE 18. Preferably, the CM 16 queries the status if the CM 16 determines an absence of incoming data transmission activity at Step 404. In a preferred embodiment of the method, Step 408 is activated by the CM 16 at Step 406. In a another preferred embodiment, the CM 16 queries the status of the one or more CPE 18 by polling CPE 18 according to a polling technique.

At Step 410, the CM 16 receives any responses from the one or more CPE 18 to the status query at Step 408. Any response from the one or more CPE 18 is a treated as an indication that at least one CPE is not off-line and the telephone dial-up connection need not be automatically terminated. If no responses are received by the CM 16 from the one or more CPE 18 to the status query at Step 408, it may be taken as at least a preliminary indication that the one or more CPE 18 are off-line and the telephone dial-up connection should be automatically terminated.

Preferably, at Step 412, the CM 16 continues to query the status of the one or more CPE 18 (as at Step 408). The CM 16 repeats Step 408 as activated by the CM 16 at Step 406, however, the CM 16 preferably does not require repeated activation at Step 406 to repeat the status query at Step 408. Preferably, the CM 16 repeats the status query of the one or more CPE 18 at Step 408 periodically until a time $t_{timeout}$. This time $t_{timeout}$ is under one minute, for example, forty-five seconds, in a preferred embodiment. Preferably, in a preferred embodiment, the CM 16 repeats Step 408 or continues to query the CPE 18 status N times. Preferably, the CM 16 queries the status of the one or more CPE 18 two to four times (2<N<4). In other embodiments of Method 400, the CM 16 queries the CPE 18 status N times within the time $t_{timeout}$. In further preferred embodiments, the CM 16 periodically queries the status of the one or more CPE 18 at time intervals $t_{repeat}$, where $t_{repeat}$ is measured in seconds. Preferably, the time intervals $t_{repeat}$ are fifteen seconds in length. In still other embodiments, the time interval $t_{repeat}$ is equivalent to the time interval $t_{determine}$ of the determining step (Step 404). In yet a further preferred embodiment, the CM 16 periodically queries the status of the one or more CPE 18 N times at time intervals $t_{repeat}$, within the time $t_{timeout}$, so that $$t_{timeout} = N(t_{repeat}).$$

These times are not limited to under one minute in all embodiments of the invention, and can, in the case of the data-over-cable system 10 of FIG. 1, vary in accordance with consideration of, or relative to, the value of the inactivity timeout/Demand Dial Timer. In still other preferred embodiments, these times are set according to or relative to the "boot" or "reboot" time of a personal computer included in the one or more CPE 18.

If a response from the one or more CPE 18 is received by the CM 16 at Step 410, the response is treated as an indication that at least one CPE 18 is not off-line and the telephone dial-up connection need not be automatically terminated. Preferably, if a response from the one or more CPE 18 is received by the CM 16 at Step 410, the CM 16 will not automatically terminate the telephone line connection and will return to continuously monitoring the NI 17 at Step 402. As described above, the CM 16 preferably monitors the NI 17 for incoming data transmission activity from the one or more CPE 18 on a continuous basis at Step 402. However, in other embodiments the CM 16 need not continue to monitor the NI 17 if monitoring the NI 17 is considered superfluous to carrying out other steps of the Method 400. For example, in other embodiments of the invention the CM 16 stops monitoring the NI 17 at Step 402 if the CM 16 begins to query the status of the one or more CPE 18 at Step 408. In accordance with these other embodiments, if a response from the one or more CPE is received by the CM 16 at Step 410, the CM 16 will not automatically terminate the telephone line connection and will begin once again monitoring the NI 17 for incoming data transmission activity from the one or more CPE 18 at Step 402.

At Step 414, the CM 16 terminates the telephone dial-up connection if no response is received by the CM 16 at Step 410. Preferably, a time limit or other limit or both are placed on how often and for how long the CM 16 queries the status at Steps 408, 412 or how long the CM 16 receives any responses from the one or more CPE 18 before the CM 16 terminates the connection. Preferably, the CM 16 terminates the telephone dial-up connection if no response is received within the time $t_{timeout}$ described above with reference to Step 412. In another preferred embodiment, the CM 16 terminates the connection if no response is received within the N repetitions of the status query at Step 408 or N times of the CM 16 continuing to query the status as described at Step 412.

In a preferred embodiment of the present invention, the Method 400 of FIGS. 14A and 14B is performed with data-over-cable system 10 with telephony return. However, a CM 16 or other network device with the capability of performing Method 400 may be used in other embodiments, such as data-over-cable system 10 with telephony return and upstream and downstream connections to the CMTS 12, or data-over-cable system 10 without telephony return.

More generally, a device other than the CM 16 shown in FIG. 1 can be used in Method 400 including a communications device, such as a telephony modem or other device that utilizes a telephone dial-up connection. Further, a network device can be substituted for CM 16 in Method 400. The network device can include other devices with data networking capabilities as known in the art such as a router, a switch, a hub, or a bridge that may or may not directly utilize a telephone connection, in addition to or instead of a communications device such as CM 16.

In a preferred embodiment, at least one of the one or more CPE 18 connected to the CM 16 includes a personal computer system. Method 400 is described with reference to one or more CPE 18, although one only CPE 18 is shown in FIG. 1 for purposes of clarity of explanation. Method 400 is not limited to one CPE 18.

Preferably, the CM 16 or network device is located externally from the CPE 18 and has multiple CPE attached. In other embodiments, the CM 16 or network device is internal to the CPE 18.

The CM 16 or network device has the NI 17 to one or more CPE 18. As described with reference to FIG. 1, the NI 17 may include the Cable Modem-to-CPE Interface ("CMCI") 20 of FIG. 1. Preferably, the network interface includes an Ethernet or similar networking hardware interface. For more information on Ethernet see the Institute of Electrical and Electronic Engineers ("IEEE") standards 802, 802.2, and 802.3 incorporated herein by reference. IEEE standards can be found on the World Wide Web at the Universal Resource Locator ("URL") "www.ieee.org." Also see Internet Engineering Task Force ("IETF") Request for Comments ("RFC"), RFC-894, and RFC 1042, incorporated herein by reference. Information for IETF RFCs can be found on the World Wide Web at URLs "ds.internic.net" or "www.ietf.org." However, other network interfaces 17 could also be used and the present invention is not limited to Ethernet interfaces.

Preferably, the data network 28 of Method 400 includes the Internet. The data network 28 is not limited to the Internet, however, can include a local-area network, wide-area network, metropolitan-area network, organizational intranet or other network to which a cable modem can provide access.

The steps of Method 400 are not otherwise limited to the order presented here. Method 400 can be performed or executed with, and can include, more or fewer steps than those in the preferred embodiments presented above.

In a preferred embodiment, a system including a CM 16 with one or more CPE 18 utilizing a telephone dial-up connection to transmit data to data network 28 further includes processes designed to carry out the steps of Method 400 to automatically terminate the telephone dial-up connection.

Figure 15:
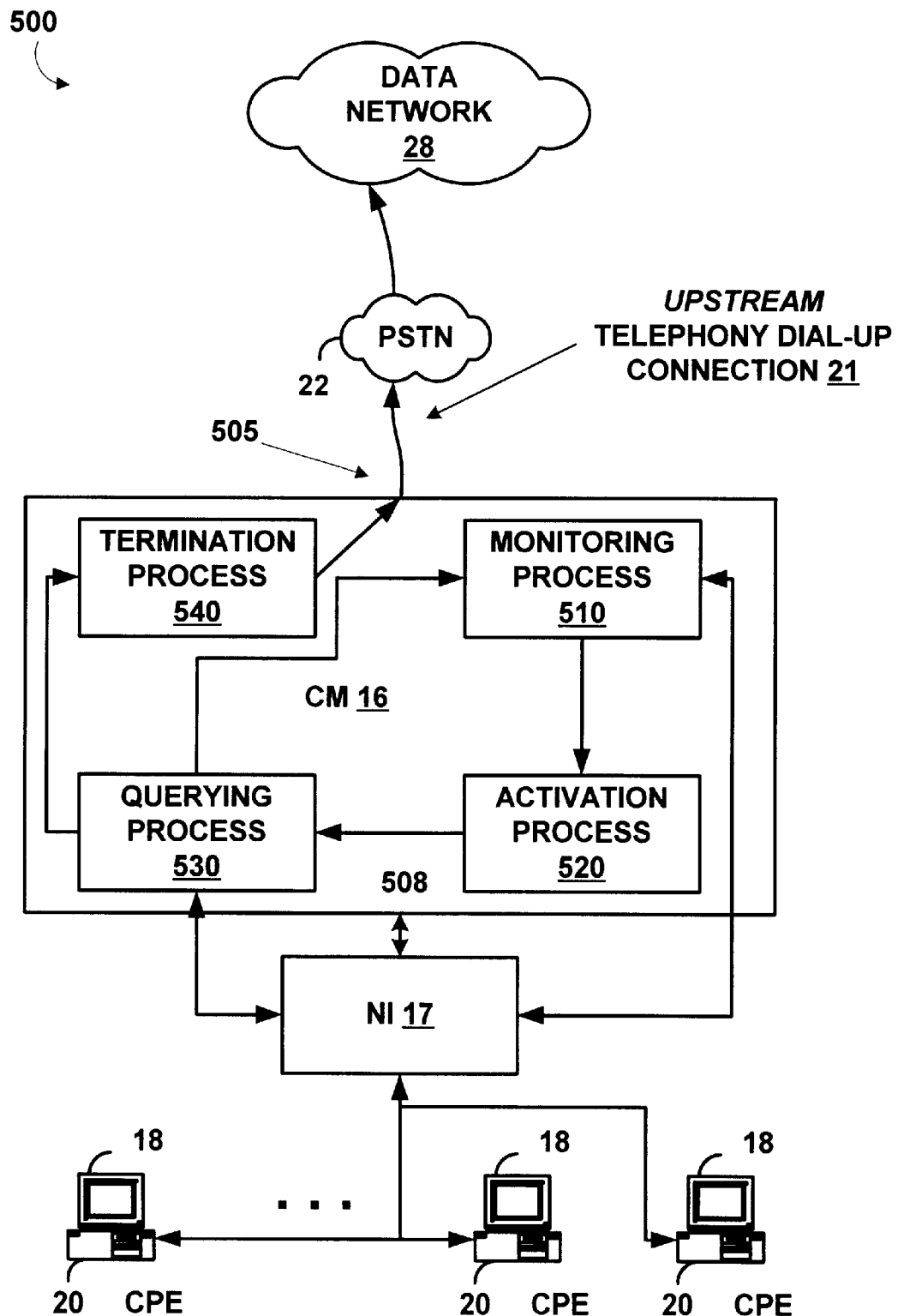
FIG. 15 is a block diagram illustrating a system for automatically terminating a telephone dial-up connection to a data network.

FIG. 15 is a block diagram illustrating an exemplary System 500 of the present invention in accordance with FIG. 1 for automatically terminating a telephone dial-up connection to a data network 28. Preferably, the System 500 includes a CM 16 or other network device, a NI 17 or other network interface, one or more CPE 18 connected to the CM 16 via the NI 17, a monitoring process 510, an activation process 520, a querying process 530, and a termination process 540. The CM 16 utilizes the telephone dial-up connection 21 at node 505 to connect to the data network 28 via PSTN 22, while the one or more CPE 18 utilize the CM 16 via the NI 17 as a relay agent to transmit data to the data network 28. As described above in FIG. 1, an individual CPE 18 is connected to CM 16 at node 508 via a Cable Modem-to-CPE Interface ("CMCI") 20. The Network Interface 17 may include the CMCI 20 or multiple CMCI 20.

Preferably, the CM 16 includes the monitoring process 510, activation process 520, querying process 530, and termination process 540 as illustrated in FIG. 15. In other embodiments of the invention, some or all of the monitoring process 510, activation process 520, querying process 530, and termination process 540 may be distinct from the CM 16.

In a preferred embodiment of System 500, the monitoring process 510 monitors the NI 17 for incoming data transmission activity from the one or more CPE 18. Preferably, the monitoring process 510 also determines an absence of incoming data transmission activity. This is at least a preliminary indication that the one or more CPE 18 may be inactive.

Preferably, the monitoring process 510determines the absence of incoming data transmission activity if the absence persists for longer than a time $t_{determine}$. This time $t_{determine}$ is under one minute, for example, fifteen seconds, in a preferred embodiment. However, this time is not limited to under one minute in all embodiments of the invention, and can, in the case of the data-over-cable system 10 of FIG. 1, vary in accordance with consideration of, or relative to, the value of the inactivity timeout/Demand Dial Timer. In still other preferred embodiments, this time is set according to or relative to the "boot" or "reboot" time of a personal computer included in the one or more CPE 18.

FIG. 15 illustrates two-way communication via the NI 17 between one or more CPE 18 and the monitoring process 510. This connection is illustrated for clarity as originating from a separate node than node 508, where the CM 16 communicates with the one or more CPE 18. Preferably, the CM 16 and the monitoring process 530 are capable of communicating with the one or more CPE 18 over the same connection. In other embodiments, however, the monitoring process 530 may be independent of the CM 16 and may communicate with and/or connect to the one or more CPE 18 by means physically separate to that of the CM 16. In still other embodiments, the monitoring process 530 may interact with the one or more CPE 18 independently of the NI 17 (not shown in FIG. 15).

Preferably, the activation process 520 is included in System 500, and activates the querying process 530 if the monitoring process 510 determines an absence of incoming transmission activity from the one or more CPE.

The querying process 530 queries the status of the one or more CPE 18. Preferably, the querying process 530 determines whether the CM 16 is no longer in use or being utilized by the one or more CPE 18 to transmit data over the telephone dial-up connection. In a preferred embodiment, the determination includes receiving any responses from the one or more CPE 18 to the status query, or to repeated status queries. Preferably, if the determination receives no responses, it determines that no CPE 18 are active and that the CM 16 is thus no longer in use or being utilized by the one or more CPE 18 to transmit data over the telephone dial-up connection. Preferably, if the determination receives any response or responses, it determines that the one or more CPE 18 are active and directs the monitoring process 510 to continue monitoring the NI 17.

Preferably, the querying process 530 repeats the status query of the one or more CPE 18 periodically until a time $t_{timeout}$. This time $t_{timeout}$ is under one minute, for example, forty-five seconds, in a preferred embodiment. Preferably, in a preferred embodiment, the querying process 530 repeats the status query or continues to query the status N times. Preferably, the querying process 530 queries the status of the one or more CPE 18 two to four times (2<N<4). In other embodiments of System 500, the querying process 530 queries the status N times within the time $t_{timeout}$. In further preferred embodiments, the querying process 530 periodically queries the status of the one or more CPE 18 at time intervals $t_{repeat}$, where $t_{repeat}$ is measured in seconds. Preferably, the time intervals $t_{repeat}$ are fifteen seconds in length. In yet a further preferred embodiment, the querying process 530 periodically queries the status of the one or more CPE 18 N times at time intervals $t_{repeat}$, within the time $t_{timeout}$, so that $$t_{timeout}=N(t_{repeat})$$

These times are not limited to under one minute in all embodiments of the invention, and can, in the case of the data-over-cable system 10 of FIG. 1, vary in accordance with consideration of, or relative to, the value of the inactivity timeout/Demand Dial Timer. In still other preferred embodiments, these times are set according to or relative to the "boot" or "reboot" time of a personal computer included in the one or more CPE 18.

FIG. 15 illustrates two-way communication via the NI 17 between one or more CPE 18 and the querying process 530. This connection is illustrated for clarity as originating from a separate node than node 508, where the CM 16 communicates with the one or more CPE 18. Preferably, the CM 16 and the querying process 530 are capable of communicating with the one or more CPE 18 over the same connection. In other embodiments, however, the querying process 530 may be independent of the CM 16 and may communicate with and/or connect to the one or more CPE 18 by means physically separate to that of the CM 16. In still other embodiments, the querying process 530 may interact with the one or more CPE 18 independently of the NI 17 (not shown in FIG. 15).

Preferably, the termination process 540 is included in System 500, and terminates the telephone dial-up connection to data network 28. Preferably, the termination process 540 terminates the connection if the querying process 530 determines that the CM 16 is no longer in use or being utilized by the one or more CPE 18 to transmit data over the telephone dial-up connection.

In the exemplary embodiment, a time limit or other limit or both are placed on how often and for how long the querying process 530 queries the status or how long the querying process 530 receives any responses from the one or more CPE 18 before the terminating process 540 terminates the connection. Preferably, the terminating process 540 terminates the telephone dial-up connection if no response is received by the querying process 530 within the time $t_{timeout}$ described above. In another preferred embodiment, the terminating process 540 terminates the connection if no response is received within the N repetitions of the status query at Step 408 or N times of the querying process 530 continuing to query the status of the one or more CPE 18.

In a preferred embodiment of the present invention, data-over-cable system 10 with telephony return includes System 500 of FIG. 15. However, System 500 may be included in other embodiments, such as data-over-cable system 10 with telephony return and upstream and downstream connections to the CMTS 12, or data-over-cable system 10 without telephony return.

More generally, a device other than the CM 16 shown in FIG. 1 can be used in System 500 including a communications device, such as a telephony modem or other device that utilizes a telephone dial-up connection. Further, a network device can be substituted for CM 16 in System 500. The network device can include other devices with data networking capabilities as known in the art such as a router, a switch, a hub, or a bridge that may or may not directly utilize a telephone connection, in addition to or instead of a communications device such as CM 16.

In a preferred embodiment, at least one of the one or more CPE 18 connected to the CM 16 includes a personal computer system. System 500 is described and illustrated in FIG. 15 with reference to one or more CPE 18 and is not limited to one CPE 18.

Preferably, the CM 16 of System 500 or network device is located externally from the CPE 18 and has multiple CPE attached. In other embodiments, the CM 16 or network device is internal to the CPE 18.

The CM 16 or network device has the NI 17 to one or more CPE 18. As described with reference to FIG. 1, the NI 17 may include the Cable Modem-to-CPE Interface ("CMCI") 20 of FIG. 1. Preferably, the network interface includes an Ethernet (referenced above) or similar networking hardware interface. However, other network interfaces 17 could also be used and the present invention is not limited to Ethernet interfaces.

Preferably, the data network 28 of System 500 includes the Internet. The data network 28 is not limited to the Internet, however, can include a local-area network, wide-area network, metropolitan-area network, organizational intranet or other network to which a cable television network provides access.

The processes of System 500 are not otherwise limited to those presented here. System 500 can include more or fewer processes than those in the preferred embodiments presented above.

With reference to the querying step (Step 408) and repetitions and continuations thereof (Step 412) of Method 400 and the querying process 530 of System 500 of the present invention, the one or more CPE 18 can be queried for their status, polled or probed according to a variety of techniques, or otherwise tested or monitored for their status, reachability, or data transmission activity by a variety of schemes and commands. As described above, both the CMTS 12 and the CM 16 have one or more routing tables (e.g., ARP tables) used for storing and updating to addressing information. The CM 16, in particular, is able to address the respective MAC 44 addresses of its own multiple CPE 18. In a preferred embodiment, the CM 16 queries the status of its one or more CPE 18 according to its internal ARP tables, as described above.

It should be understood that the querying or other reachability testing can occur repeatedly, periodically, or continuously in time. In other embodiments, commands, communication control procedures, or remote procedure calls implementing Packet Internet Groper ("PING") commands, ARP commands, or Exchange Identification ("XID") messages or commands are used to perform the querying or polling steps in accordance with the method 400 described above, or to carry out the querying process in accordance with the aforementioned System 500. In addition, polling, querying, or reachability testing CPE 18 or connected customer premise equipment (CPE) 18 according to a step or a process can be accomplished according to a particular selection order, a specific algorithm, or according to network topology dependent criteria.

Preferably, Exchange Identification (XID) commands and/or responses are utilized in the performance of the querying or polling steps in accordance with the method 400 described above, and to carry out the querying process in accordance with the aforementioned System 500. As is known in the art, XID is one of several Type 1 Operation commands used in the Logical Link Control (LLC) protocol of the Data link layer of the OSI model for connectionless data communication between service access points. For more information on the Logical Link Control protocol and the XID commands and/or responses see the Institute of Electrical and Electronic Engineers ("IEEE") standard 802.2, Second edition, 1994, Part 2: Logical link control incorporated herein by reference. IEEE standards can be found on the World Wide Web at the Universal Resource Locator ("URL") "www.ieee.org."

As is known in the art, PING is a function of ICMP layer 56, used for reachability testing of networked hosts. For more information on PING, or Packet InterNet Groper, see Internet Engineering Task Force ("IETF") Request for Comments ("RFC"), RFC-1739, incorporated herein by reference. Information for IETF RFCs can be found on the World Wide Web at URLs "ds.internic.net" or "www.ietf.org."

With reference to the above described Method 400 and System 500 of the present invention, numerous embodiments and combinations of repetitions of and timing limitations on the querying steps and processes can be used. It should be understood that the invention is not limited to the values proposed for the illustrative time periods $t_{determine}$, $t_{repeat}$, and $t_{timeout}$. In the case of data-over-cable system 10 of FIG. 1, the time periods described above will be, in general, significantly shorter than the value of the inactivity timeout/Demand Dial Timer of the data-over-cable system of FIG. 1. Preferably, these times will be an order of magnitude lower than the inactivity timeout/Demand Dial Timer. In still other preferred embodiments, these times are set according to or relative to the "boot" or "reboot" time of a personal computer included in the one or more CPE 18.

The steps of Method 400 and the processes of System 500 can be executed by a central processing unit, digital signal processor, firmware, or an application specific integrated circuit ("ASIC"). The programmatic instructions causing the steps or processes to be executed can be stored in semi-permanent computer memory such as a read-only memory (ROM), or in a computer readable medium such as a computer hard drive. Preferably, the central processing unit, firmware, or ASIC is located on the CM 16 or other network or communications device, but a variety of other implementations and locations can be used.

Presented is a cable modem device that automatically drops a telephone line connection more quickly than as directed by the inactivity timeout set by the cable television network headend. A user who turns his or her computer off or no longer wishes to connect to the Internet will be able to use his or her telephone line for other purposes more immediately and will be more likely to decrease his or her telephone usage charges than under the present cable modem termination system.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

I claim:

1. In a network device, a method of automatically terminating an upstream connection to a data network, from the network device having a network interface to one or more consumer premise equipment, comprising the steps of:

monitoring the network interface for incoming data transmission activity from the one or more consumer premise equipment;

determining an absence of incoming data transmission activity;

querying, from the network device, the status of the one or more consumer premise equipment;

receiving any responses from the one or more consumer premise equipment; and terminating the upstream connection to the data network if no response is received in the receiving step from the one or more consumer premise equipment.

2. The method of claim 1, further comprising the step of: repeating the querying step N times.

3. The method of claim 2, wherein the terminating step further comprises:

terminating the telephone dial-up connection if no response is received in the receiving step from the one or more consumer premise equipment within N repetitions of the querying step.

4. The method of claim 3, wherein the N repetitions of the querying step is three.

5. The method of claim 2, wherein the N repetitions of the querying step is three.

6. The method of claim 1, wherein the determining step further comprises:

determining an absence of incoming data transmission activity if the absence of incoming data transmission activity persists for longer than a time $t_{determine}$.

7. The method of claim 6, further comprising the step of:
activating the querying step if the determining step determines an absence of incoming data transmission activity.

8. The method of claim 6, wherein the querying step further comprises:
querying the status of the one or more consumer premise equipment if the determining step determines an absence of incoming data transmission activity.

9. The method of claim 1, further comprising the step of:
activating the querying step if the determining step determines an absence of incoming data transmission activity.

10. The method of claim 9, wherein the querying step further comprises:
querying the status of the one or more consumer premise equipment if the activating step activates the querying step.

11. The method of claim 1, wherein the terminating step further comprises:
terminating the telephone dial-up connection if no response is received in the receiving step from the one or more consumer premise equipment within a time $t_{timeout}$.

12. The method of claim 11, wherein the time $t_{timeout}$ is forty-five seconds.

13. The method of claim 1, wherein the querying step further comprises:
querying the status of the one or more consumer premise equipment if the determining step determines an absence of incoming data transmission activity.

14. The method of claim 1, wherein the querying step further comprises:
polling the one or more consumer premise equipment according to a polling technique.

15. The method of claim 1 wherein the querying step further comprises:
querying the status of the one or more consumer premise equipment utilizing Packet Internet Groper (PING).

16. The method of claim 1 wherein the querying step further comprises:
querying the status of the one or more consumer premise equipment utilizing Address Resolution Protocol (ARP).

17. The method of claim 1 wherein the querying step further comprises:
querying the status of the one or more consumer premise equipment utilizing Exchange Identification (XID).

18. The method of claim 1, wherein the querying step further comprises:
querying the status of the one or more consumer premise equipment according to a particular selection order.

19. The method of claim 1, further comprising the step of:
repeating the querying step periodically until a time $t_{timeout}$.

20. The method of claim 19, wherein the time $t_{timeout}$ is forty-five seconds.

21. The method of claim 1, further comprising the step of:
repeating the querying step at the time intervals $t_{repeat}$.

22. The method of claim 1, further comprising the step of:
repeating the querying step N times at time intervals $t_{repeat}$ until a time $t_{timeout}$.

23. The method of claim 1, further comprising the step of:
repeating the querying step until a response is received in the receiving step; wherein if a response is received, return to the monitoring step.

24. The method of claim 1, wherein the network device performs the steps of the method.

25. The method of claim 1 wherein the network interface comprises an Ethernet interface.

26. The method of claim 1 wherein the network device comprises a cable modem.

27. The method of claim 1 wherein the network device is external to the one or more consumer premise equipment.

28. The method of claim 1 wherein the network device comprises a router.

29. The method of claim 1 wherein the network device comprises a switch.

30. The method of claim 1 wherein the network device comprises a hub.

31. The method of claim 1 wherein the network device comprises a bridge.

32. The method of claim 1 wherein the one or more consumer premise equipment further comprises at least one personal computer system.

33. A computer readable medium having stored therein instructions for causing a central processing unit to execute the method of claim 1.

34. A system for automatically terminating a telephone dial-up connection to a data network, comprising:
a network device, wherein the network device utilizes the telephone dial-up connection to transmit data to the data network;
a network interface;
one or more consumer premise equipment utilizing the network device via the network interface to transmit data over the telephone dial-up connection; and
a querying process wherein the querying process queries the status of the one or more consumer premise equipment and determines whether the network device is no longer being utilized by the one or more consumer premise equipment to transmit data over the telephone dial-up connection.

35. The system of claim 34 further comprising:
a monitoring process wherein the monitoring process monitors the network interface for incoming data transmission activity from the one or more consumer premise equipment.

36. The system of claim 35, further comprising:
an activation process wherein the activation process activates the querying process.

37. The system of claim 36, further comprising:
a termination process wherein the termination process terminates the telephone dial-up connection.

38. The system of claim 35, further comprising:
a termination process wherein the termination process terminates the telephone dial-up connection.

39. The system of claim 34, further comprising:
an activation process wherein the activation process activates the querying process.

40. The system of claim 39, further comprising:
a termination process wherein the termination process terminates the telephone dial-up connection.

41. The system of claim 34, further comprising:
a monitoring process wherein the monitoring process monitors the network interface for incoming data transmission activity from the one or more consumer premise equipment and determines an absence of incoming data transmission activity.

42. The system of claim 34, further comprising:

an activation process wherein the activation process activates the querying process if the monitoring process determines an absence of incoming data transmission activity.

43. The system of claim 34, further comprising:

a termination process wherein the termination process terminates the telephone dial-up connection.

44. The system of claim 34, further comprising:

a termination process wherein the termination process terminates the telephone dial-up connection if the querying process determines that the network device is no longer being utilized by the one or more consumer premise equipment.

45. In a network device, a method of automatically terminating an upstream connection to a data network, from the network device having a network interface to one or more consumer premise equipment, comprising the steps of:

monitoring the network interface for incoming data transmission activity from the one or more consumer premise equipment;

querying, from the network device, the status of the one or more consumer premise equipment; and terminating the upstream connection to the data network if no response is received from the one or more consumer premise equipment.

46. The method of claim 45, further comprising the step of:

receiving any responses from the one or more consumer premise equipment.

47. The method of claim 46, wherein the terminating step further comprises:

terminating the telephone dial-up connection if no response is received in the receiving step from the one or more consumer premise equipment.

48. A system for automatically terminating a telephone dial-up connection to a data network, comprising:

a network device, wherein the network device utilizes the telephone dial-up connection to transmit data to the data network;

a network interface;

one or more consumer premise equipment utilizing the network device via the network interface to transmit data over the telephone dial-up connection;

a monitoring process wherein the monitoring process monitors the network interface for incoming data transmission activity from the one or more consumer premise equipment and determines an absence of incoming data transmission activity;

an activation process wherein the activation process activates the querying process if the monitoring process determines an absence of incoming data transmission activity;

a querying process wherein the querying process queries the status of the one or more consumer premise equipment and determines whether the network device is no longer being utilized by the one or more consumer premise equipment to transmit data over the telephone dial-up connection; and a termination process wherein the termination process terminates the telephone dial-up connection if the querying process determines that the network device is no longer being utilized by the one or more consumer premise equipment.

49. The system of claim 48 wherein the network device comprises a cable modem.

50. The system of claim 48 wherein the data network comprises the Internet.

51. The system of claim 48 wherein the one or more consumer premise equipment comprise at least one personal computer system.

52. The system of claim 48 wherein:

the network device comprises a cable modem;

the network interface comprises an Ethernet interface;

the data network comprises the Internet; and the one or more consumer premise equipment comprise at least one personal computer system.

* * * * *